(12) United States Patent
Mizusaki et al.

(10) Patent No.: US 11,156,873 B2
(45) Date of Patent: Oct. 26, 2021

(54) ALIGNMENT FILM, LIQUID CRYSTAL PANEL, AND METHOD FOR PRODUCING LIQUID CRYSTAL PANEL

(71) Applicant: SHARP KABUSHIKI KAISHA, Osaka (JP)

(72) Inventors: Masanobu Mizusaki, Sakai (JP); Hiroshi Tsuchiya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 192 days.

(21) Appl. No.: 16/127,697

(22) Filed: Sep. 11, 2018

(65) Prior Publication Data

US 2019/0079357 A1 Mar. 14, 2019

(30) Foreign Application Priority Data

Sep. 11, 2017 (JP) .............................. JP2017-174265

(51) Int. Cl.
*G02F 1/1337* (2006.01)
*C09K 19/56* (2006.01)
(Continued)

(52) U.S. Cl.
CPC ....... *G02F 1/133723* (2013.01); *C08G 73/10* (2013.01); *C08G 73/1078* (2013.01); *C08J 5/18* (2013.01); *C09K 19/56* (2013.01); *G02F 1/133788* (2013.01); *C08J 2379/08* (2013.01); *C09K 2019/0448* (2013.01); *C09K 2323/023* (2020.08); *C09K 2323/025* (2020.08); *C09K 2323/027* (2020.08); *G02F 1/133742* (2021.01); *G02F 1/133784* (2013.01)

(58) Field of Classification Search
CPC ............... C08G 73/10; C08G 73/1078; G02F 1/133723; G02F 1/133788; G02F 2001/133742; Y10T 428/1023; C09K 2323/025; C09K 2323/027; C09K 2323/023
See application file for complete search history.

(56) References Cited

U.S. PATENT DOCUMENTS

2004/0031950 A1* 2/2004 Shimizu ................. C09K 19/56
252/299.4
2005/0259203 A1* 11/2005 Kimura ............. G02F 1/133788
349/124

(Continued)

FOREIGN PATENT DOCUMENTS

| CN | 103250259 A | 8/2013 |
| JP | 5-31341 A | 2/1993 |
| JP | 2014-005437 A | 1/2014 |

*Primary Examiner* — Sophie Hon
(74) *Attorney, Agent, or Firm* — ScienBiziP, P.C.

(57) ABSTRACT

The present invention provides an alignment film capable of reducing generation of bubbles in a liquid crystal layer, a liquid crystal panel including the alignment film, and a method for producing the liquid crystal panel. The alignment film contains at least one selected from the group consisting of a polyamic acid containing a bisaniline fluorene skeleton and a polyimide containing a bisaniline fluorene skeleton. Preferably, the bisaniline fluorene skeleton of the polyamic acid is contained in a diamine unit of the polyamic acid and the bisaniline fluorene skeleton of the polyimide is contained in a diamine unit of the polyimide.

17 Claims, 1 Drawing Sheet

(51) Int. Cl.
    *C08J 5/18*     (2006.01)
    *C08G 73/10*     (2006.01)
    *C09K 19/04*     (2006.01)

(56) References Cited

U.S. PATENT DOCUMENTS

| | | | |
|---|---|---|---|
| 2009/0280236 A1* | 11/2009 | Hsueh | C08G 73/1007 427/58 |
| 2011/0025967 A1* | 2/2011 | Sohn | G02F 1/133711 349/124 |
| 2012/0013837 A1* | 1/2012 | Terashita | G02F 1/133711 349/127 |
| 2013/0233381 A1 | 9/2013 | Win et al. | |
| 2013/0280661 A1* | 10/2013 | Ishigaki | G03F 7/40 430/319 |
| 2015/0055070 A1* | 2/2015 | Kunimatsu | G02F 1/133345 349/123 |

* cited by examiner

ALIGNMENT FILM, LIQUID CRYSTAL PANEL, AND METHOD FOR PRODUCING LIQUID CRYSTAL PANEL

CROSS-REFERENCE TO RELATED APPLICATION

The present application claims priority under 35 U.S.C. § 119 to Japanese Patent Application No. 2017-174265 filed on Sep. 11, 2017, the contents of which are incorporated herein by reference in their entirety.

BACKGROUND OF THE INVENTION

Field of the Invention

The present invention relates to alignment films, liquid crystal panels, and methods for producing a liquid crystal panel. The present invention specifically relates to an alignment film containing at least one selected from the group consisting of a polyamic acid and a polyimide, a liquid crystal panel including the alignment film, and a method for producing the liquid crystal panel.

Description of Related Art

Liquid crystal display devices are display devices which utilize a liquid crystal material in order to provide display. In a typical display mode thereof, a liquid crystal panel containing a liquid crystal material between paired substrates is irradiated with light from a backlight and voltage is applied to the liquid crystal material so that the alignment of liquid crystal molecules is changed, whereby the amount of light passing through the liquid crystal panel is controlled. Liquid crystal display devices are provided with an alignment film undergone an alignment treatment in order to control the alignment of liquid crystal molecules.

For components of liquid crystal display devices, JP 2014-5437 A discloses an insulation film for touch panels formed from a resin composition containing a compound or cardo resin represented by a specific formula and a silane compound having a urethane or amide skeleton.

BRIEF SUMMARY OF THE INVENTION

A liquid crystal display device includes paired substrates consisting of a thin film transistor (TFT) substrate provided with switching elements and a color filter (CF) substrate facing the TFT substrate, and a liquid crystal layer disposed therebetween. The TFT substrate is provided with pixel electrodes, while the TFT substrate or the CF substrate is provided with a common electrode. A change in voltage applied between these electrodes enables control of the alignment of liquid crystal molecules contained in the liquid crystal layer. On the side adjacent to the liquid crystal layer of each of the TFT substrate and the CF substrate is provided with an alignment film for controlling the alignment of liquid crystal molecules in a state of applying no voltage.

The TFT substrate is commonly provided with an interlayer insulation film so as to prevent interactions such as contact between each pixel electrode and the corresponding TFT or a conductive line material and achieve a high aperture ratio. The interlayer insulation film may be a positive resist patterned by a photolithographic process so as to establish communication between a TFT and the corresponding pixel electrode, for example. The positive resist may optionally contain a compound containing a naphthoquinone diazide group (a naphthoquinone diazide compound (hereinafter, also referred to as NQD)) represented by the formula (N1) to be shown below. The NQD is a highly reactive photo-sensitive material (e.g., a photosensitizer), and can reduce occurrence of defects due to contact failure between a TFT and the corresponding pixel electrode.

When irradiated with light such as ultraviolet light, however, the NQD generates nitrogen ($N_2$) gas, and then generates an indenecarboxylic acid, which is a photo-reaction product of NQD, in accordance with the reaction scheme shown in the following formula 1. As the amount of nitrogen gas generated increases, such nitrogen gas more easily leaves from the interlayer insulation film, passes through the alignment film, and finally dissolves in the liquid crystal layer. The nitrogen gas dissolved in the liquid crystal layer is visually observed as bubbles.

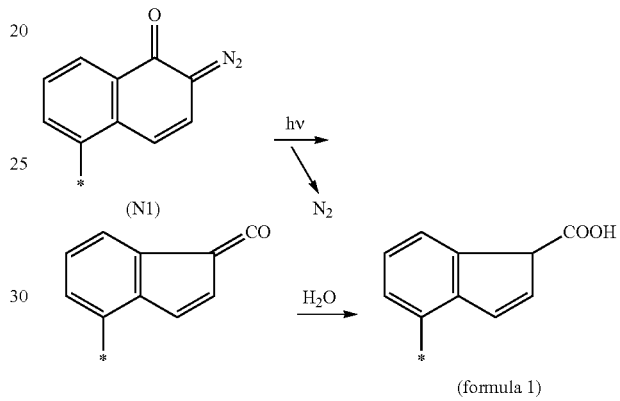

(formula 1)

In the formula 1, the symbol * represents the binding site.

The bubbles derived from nitrogen gas are easily generated particularly in a PSA-mode liquid crystal panel utilizing a polymer sustained alignment (PSA) technique, in other words, a liquid crystal panel which requires ultraviolet irradiation for polymerization of a monomer after production of the liquid crystal panel. Also, such bubbles derived from nitrogen gas may be generated in the liquid crystal layer of liquid crystal panels used together with a high-luminance backlight, such as digital signage, large liquid crystal panels for televisions, and onboard liquid crystal panels.

However, JP 2014-5437 A completely fails to examine bubbles generated in a liquid crystal layer.

The present invention has been made in view of the above current state of the art, and aims to provide an alignment film capable of reducing generation of bubbles in a liquid crystal layer, a liquid crystal panel including the alignment film, and a method for producing the liquid crystal panel.

The present inventors have performed various studies on an alignment film capable of reducing generation of bubbles in a liquid crystal layer, a liquid crystal panel including the alignment film, and a method for producing the liquid crystal panel. The present inventors have then found that an alignment film that contains at least one selected from the group consisting of a polyamic acid containing a bisaniline fluorene skeleton and a polyimide containing a bisaniline fluorene skeleton can reduce permeation of nitrogen gas generated in the liquid crystal panel through the alignment film and dissolution of the nitrogen gas in the liquid crystal layer. Thereby, the present inventors have arrived at the solution of the above problems, completing the present invention.

Specifically, one aspect of the present invention may be an alignment film containing at least one selected from the group consisting of a polyamic acid containing a bisaniline fluorene skeleton and a polyimide containing a bisaniline fluorene skeleton.

The bisaniline fluorene skeleton of the polyamic acid may be contained in a diamine unit of the polyamic acid, and the bisaniline fluorene skeleton of the polyimide may be contained in a diamine unit of the polyimide.

At least one selected from the group consisting of the bisaniline fluorene skeleton of the polyamic acid and the bisaniline fluorene skeleton of the polyimide may contain at least one of the structures represented by the following respective formulae (B1-1) to (B1-11):

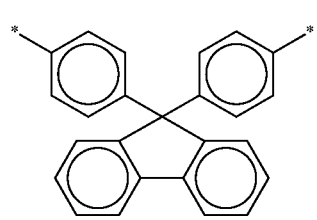
(B1-1)

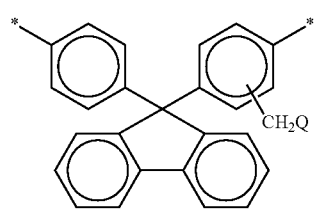
(B1-2)

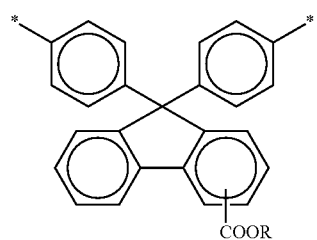
(B1-3)

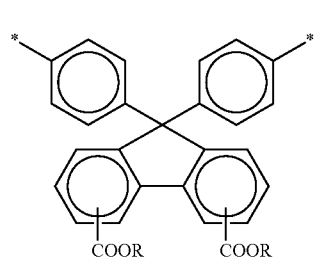
(B1-4)

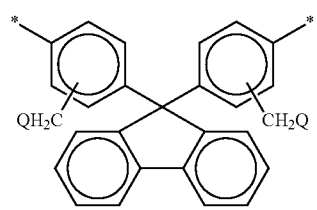
(B1-5)

-continued

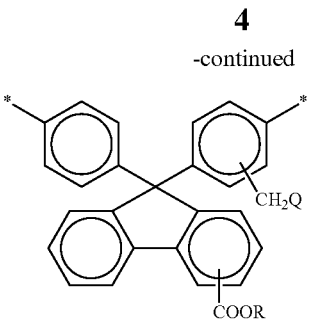
(B1-6)

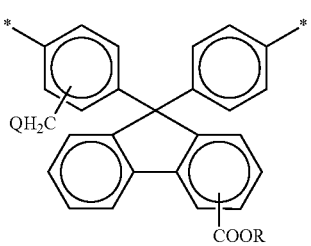
(B1-7)

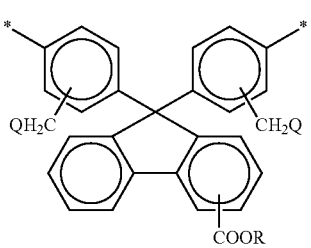
(B1-8)

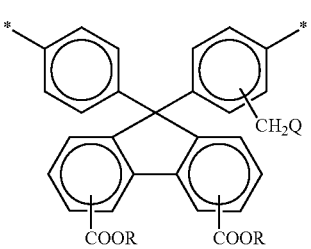
(B1-9)

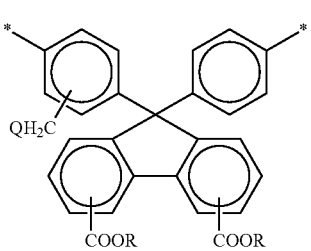
(B1-10)

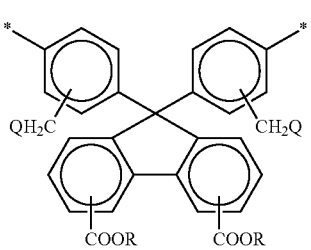
(B1-11)

wherein Rs are the same as or different from each other, and are each a hydrogen atom or a C1-C12 alkyl group; Qs are the same as or different from each other, and are each a hydrogen atom, a fluorine atom, a chlorine atom, or a bromine atom; and at least one hydrogen atom of an alkyl group may be replaced by a fluorine atom.

The alignment film may further contain a polymer that vertically aligns liquid crystal molecules or a polymer that horizontally aligns liquid crystal molecules.

The alignment film may further contain a polymer containing a photo-alignment functional group.

The photo-alignment functional group may include at least one group selected from the group consisting of cinnamate, azobenzene, coumarin, chalcone, and cyclobutane groups.

At least one selected from the group consisting of the polyamic acid and the polyimide may be a polymer that vertically aligns liquid crystal molecules or a polymer that horizontally aligns liquid crystal molecules.

At least one selected from the group consisting of the polyamic acid and the polyimide may further contain a photo-alignment functional group.

The photo-alignment functional group may include at least one group selected from the group consisting of cinnamate, azobenzene, coumarin, chalcone, and cyclobutane groups.

Another aspect of the present invention may be a liquid crystal panel including the alignment film, a first substrate, a second substrate facing the first substrate, and a liquid crystal layer between the first substrate and the second substrate, the alignment film being disposed on a surface of at least one selected from the group consisting of the first substrate and the second substrate, the surface being adjacent to the liquid crystal layer.

At least one substrate provided with the alignment film selected from the first substrate and the second substrate may include an insulation film containing at least one selected from the group consisting of a positive resist and a photo-reaction product thereof.

The positive resist may contain a naphthoquinone diazide compound.

The liquid crystal panel may further include a polymer layer.

Another aspect of the present invention may be a method for producing a liquid crystal panel, including: forming the alignment film on a surface of at least one selected from the group consisting of a first substrate and a second substrate; and sealing a liquid crystal material between the first substrate and the second substrate to form a liquid crystal layer.

At least one substrate provided with the alignment film selected from the first substrate and the second substrate may include an insulation film containing at least one selected from the group consisting of a positive resist and a photo-reaction product thereof.

The positive resist may contain a naphthoquinone diazide compound.

The method for producing a liquid crystal panel may further include forming a polymer layer.

The liquid crystal material may contain a polymerizable monomer, and in the formation of the polymer layer, the liquid crystal layer may be irradiated with ultraviolet light and thereby the polymerizable monomer may be polymerized to form a polymer, and then the polymer may be phase-separated, whereby the polymer layer may be formed.

The present invention can provide an alignment film capable of reducing generation of bubbles in a liquid crystal layer, a liquid crystal panel including the alignment film, and a method for producing the liquid crystal panel.

DETAILED DESCRIPTION OF THE INVENTION

Figure 1:
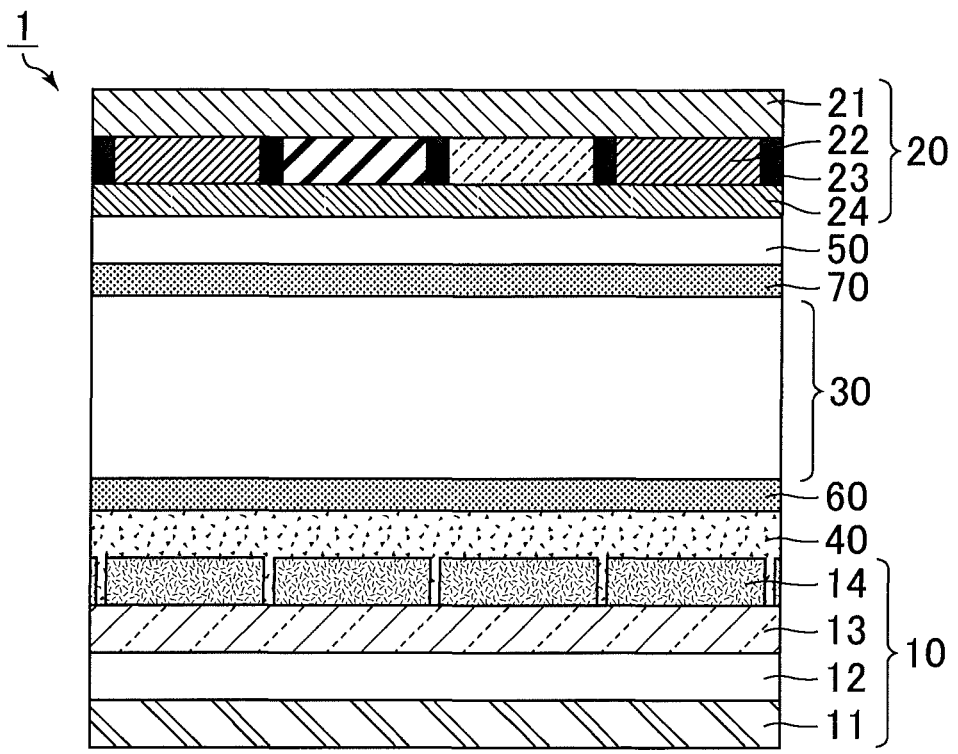
FIG. 1 is a schematic cross-sectional view of a liquid crystal panel of Embodiment 3.

Hereinafter, the present invention is described in more detail based on embodiments with reference to the drawing. The embodiments, however, are not intended to limit the scope of the present invention. The configurations of the embodiments may appropriately be combined or modified within the spirit of the present invention. In the present specification, the symbol * in the formulae represents the binding site.

Embodiment 1

In the present embodiment, an alignment film that contains at least one selected from the group consisting of a polyamic acid containing a bisaniline fluorene skeleton and a polyimide containing a bisaniline fluorene skeleton is described. In a polyamic acid, some of carboxyl groups of amic acids (amide acids) may be dehydrated and cyclized and a molecule of the polymer may be partially imidized. In the present specification, a polymer derived from a polyamic acid by partial imidization of a molecule of the polymer is referred to as a polyimide.

The alignment film has a function of controlling the alignment of a liquid crystal compound in a liquid crystal layer disposed between a first substrate and a second substrate in a liquid crystal panel. When a voltage applied to the liquid crystal layer is lower than the threshold voltage (including the case of applying no voltage), the alignment of a liquid crystal compound in the liquid crystal layer is controlled mainly by the function of the alignment film. In this state (hereinafter, also referred to as an initial alignment state), the angle formed by the major axis of the liquid crystal compound relative to the surfaces of the first substrate and the second substrate is called a "pre-tilt angle". The term "pre-tilt angle" as used herein means the angle of inclination of the liquid crystal compound from the direction parallel to the substrate surfaces, with the angle parallel to the substrate surfaces being 0° and the angle normal to the substrate surfaces being 90°.

The alignment film may substantially vertically align the liquid crystal compound in the liquid crystal layer (vertical alignment film) or may substantially horizontally align the liquid crystal compound in the liquid crystal layer (horizontal alignment film). In the case of a vertical alignment film, the term "substantially vertical" preferably means that the pre-tilt angle is 85° or greater and 90° or smaller. In the case of a horizontal alignment film, the term "substantially horizontal" preferably means that the pre-tilt angle is 0° or greater and 5° or smaller.

The alignment treatment for the alignment film may be any treatment, such as rubbing treatment or photo-alignment treatment.

The rubbing treatment is a technique of rubbing a surface of the alignment film in a certain direction by pressing a roller wrapped with cloth (e.g., nylon) at a certain pressure against each of the first and second substrates coated with the alignment film and rotating the roller thereon.

The photo-alignment treatment is a technique of giving an alignment azimuth to liquid crystal molecules by irradiating the alignment film with linearly polarized ultraviolet light to selectively change the structure of the alignment film in the polarization direction, and thereby generating anisotropy in the alignment film. In this case, the alignment film is formed from a material exhibiting photo-alignability, and this film is also referred to as a photo-alignment film. The material exhibiting photo-alignability as used herein means a material whose structure is changed by application of light (electromagnetic waves) such as ultraviolet light or visible light so that it exhibits an ability to control the alignment of nearby liquid crystal molecules (alignment-regulating force) or any material whose alignment-regulating force is changed in magnitude and/or direction. Examples of the material exhibiting photo-alignability include those containing a photo-reactive moiety (photo-alignment functional group, photo-functional group) which is to cause a reaction such as dimerization (dimer formation), isomerization, photo-Fries rearrangement, or decomposition when exposed to light.

Examples of a photo-alignment functional group to be dimerized and isomerized by light irradiation include cinnamate, chalcone, coumarin, and stilbene groups. These functional groups, including a cinnamate group, are presumed to be isomerized before dimerization in some cases. Examples of a photo-alignment functional group to be isomerized by light irradiation include azobenzene and tolane groups. Examples of a photo-alignment functional group to be photo-Fries rearranged by light irradiation include phenol ester structures. Examples of a photo-alignment functional group to be decomposed by light irradiation include cyclobutane structures.

The bisaniline fluorene skeleton of each of the polyamic acid and the polyimide which may be contained in the alignment film of the present embodiment has a structure represented by the following formula (BAFL). This structure is preferably a divalent group, and at least one hydrogen atom in the structure represented by the following formula (BAFL) may be replaced by a different group. The different group may be at least one selected from the group consisting of —COOR and —CH$_2$Q, wherein Rs are the same as or different from each other, and are each a hydrogen atom or a C1-C12 alkyl group; Qs are the same as or different from each other, and are each a hydrogen atom, a fluorine atom, a chlorine atom, or a bromine atom; and at least one hydrogen atom of an alkyl group may be replaced by a fluorine atom.

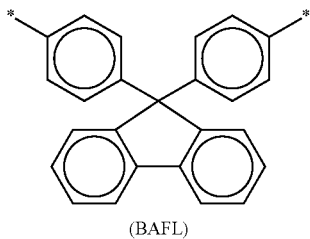

(BAFL)

A polymer membrane having the bisaniline fluorene skeleton structure may be used as a $CO_2/N_2$ separation membrane. A membrane formed from a polymer having the bisaniline fluorene skeleton is permeable to $CO_2$ and impermeable to $N_2$. In the present embodiment, this function can reduce permeation of nitrogen gas generated in the liquid crystal panel through the alignment film and dissolution of the nitrogen gas in the liquid crystal layer, reducing generation of bubbles in the liquid crystal layer.

The naphthoquinone diazide compound (NQD) contained in a positive resist generates nitrogen gas by light (e.g., ultraviolet light) irradiation. Still, even in the case of a liquid crystal panel including an insulation film (interlayer insulation film) containing at least one selected from the group consisting of the NQD and a photo-reaction product thereof, the alignment film of the present embodiment can reduce permeation of nitrogen gas generated in the liquid crystal panel through the alignment film of the present embodiment and dissolution of the nitrogen gas in the liquid crystal layer, reducing generation of bubbles in the liquid crystal layer.

The bubbles derived from nitrogen gas are easily generated particularly in PSA-mode liquid crystal panels utilizing the PSA technique, in other words, in liquid crystal panels which require ultraviolet irradiation for polymerization of a monomer after production of the liquid crystal panels. Also, in liquid crystal panels to be used together with a high-luminance backlight, such as digital signage, large liquid crystal panels for televisions, and onboard liquid crystal panels, bubbles derived from nitrogen gas may be generated in the liquid crystal layer. Even in the case of PSA-mode liquid crystal panels and liquid crystal panels to be used together with a high-luminance backlight, such as digital signage, large liquid crystal panels for televisions, and onboard liquid crystal panels, the alignment film of the present embodiment can be suitably used because it can reduce permeation of nitrogen gas generated in the liquid crystal panel through the alignment film of the present embodiment and dissolution of the nitrogen gas in the liquid crystal layer, reducing generation of bubbles in the liquid crystal layer.

At least one selected from the group consisting of the bisaniline fluorene skeleton of the polyamic acid and the bisaniline fluorene skeleton of the polyimide preferably contains at least one of the structures represented by the following respective formulae (B1-1) to (B1-11). Such a structure can further reduce permeation of nitrogen gas generated in the liquid crystal panel through the alignment film and dissolution of the nitrogen gas in the liquid crystal layer.

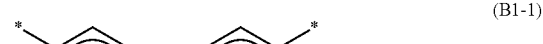

(B1-1)

(B1-2)

(B1-3)

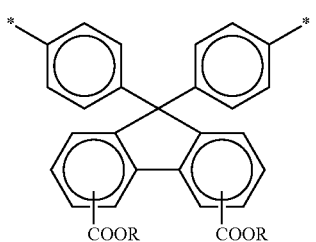 (B1-4)

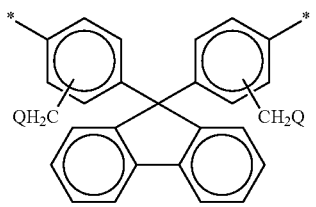 (B1-5)

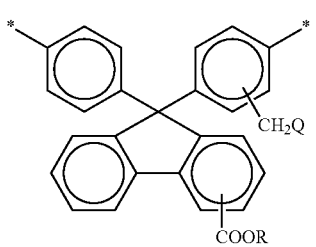 (B1-6)

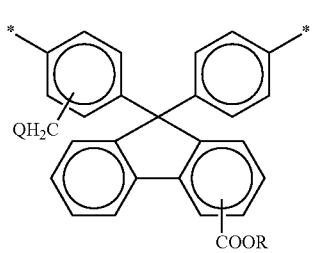 (B1-7)

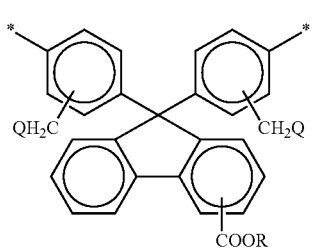 (B1-8)

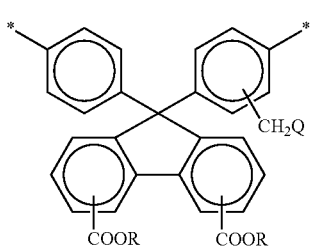 (B1-9)

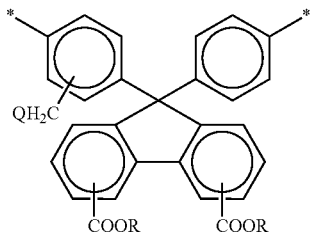 (B1-10)

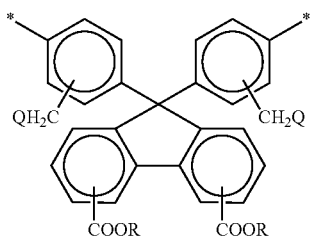 (B1-11)

In the formulae (B1-1) to (B1-11), Rs are the same as or different from each other, and are each a hydrogen atom or a C1-C12 alkyl group; Qs are the same as or different from each other, and are each a hydrogen atom, a fluorine atom, a chlorine atom, or a bromine atom; and at least one hydrogen atom of an alkyl group may be replaced by a fluorine atom.

The bisaniline fluorene skeleton of the polyamic acid is preferably contained in a diamine unit of the polyamic acid, and the bisaniline fluorene skeleton of the polyimide is preferably contained in a diamine unit of the polyimide. Such a structure allows the bisaniline fluorene skeleton to be introduced into a polyamic acid or a polyimide easily. The term diamine unit as used herein means a partial structure derived from a diamine in a polyamic acid (a precursor of polyimide) or polyimide synthesized from a tetracarboxylic dianhydride and a diamine as materials.

The polyamic acid may contain one bisaniline fluorene skeleton or two or more different bisaniline fluorene skeletons. Similarly, the polyimide may contain one bisaniline fluorene skeleton or two or more different bisaniline fluorene skeletons. The polyamic acid and the polyimide each may be either a homopolymer or a copolymer. The alignment film may contain one polyamic acid or two or more different polyamic acids, and the alignment film may contain one polyimide or two or more different polyimides.

The polyamic acid containing a bisaniline fluorene skeleton and the polyimide containing a bisaniline fluorene skeleton each preferably have a weight average molecular weight of 10,000 to 1,000,000, more preferably 30,000 to 200,000. With a weight average molecular weight within the above range, the polymer can be easily uniformly formed into a film with a desired thickness. With too low a weight average molecular weight, a film with a desired thickness is difficult to form. Too thick a film may fail to have a uniform thickness, possibly resulting in a significantly uneven surface. With too high a weight average molecular weight, a liquid crystal alignment agent may have too high a viscosity, possibly resulting in a failure in producing a film by, for example, an ink-jet technique.

The polyamic acid in the present embodiment preferably contains at least one structure represented by the following formula (PA-1), and the polyimide in the present embodiment preferably contains at least one structure represented by the following formula (PI-1).

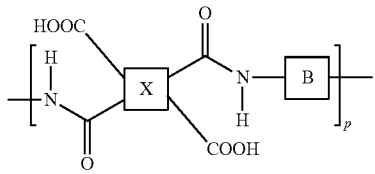
(PA-1)

In the formula (PA-1), Bs are the same as or different from each other, and are each a divalent group containing the structure represented by the formula (BAFL); Xs are the same as or different from each other, and are each a tetravalent group; and p is an integer of 1 or greater.

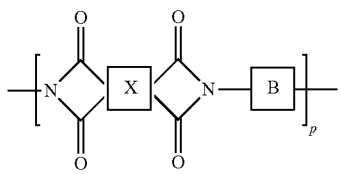
(PI-1)

In the formula (PI-1), Bs are the same as or different from each other, and are each a divalent group containing a structure represented by the above formula (BAFL); Xs are the same as or different from each other, and are each a tetravalent group; and p is an integer of 1 or greater.

A set of Bs in the formula (PA-1) and a set of Bs in the formula (PI-1) each preferably include at least one of the structures represented by the above respective formulae (B1-1) to (B1-11).

Xs in the formula (PA-1) and Xs in the formula (PI-1) are the same as or different from each other, and are each a tetravalent group, more preferably a C4-C20 tetravalent group containing at least one selected from the group consisting of an aromatic group and an alicyclic group, still more preferably a C6-C20 tetravalent group containing an aromatic group or a C4-C20 tetravalent group containing an alicyclic group, particularly preferably a C4-C10 tetravalent group containing a C4-C6 alicyclic group. When two or more cyclic structures are present, they may be bonded directly or via a linking group, or may be condensed. Examples of the linking group include C1-C5 hydrocarbon, —O—, —N═N—, —C≡C—, —CH═CH—, and —CO—CH═CH— groups.

Specific examples of X include chemical structures represented by the following respective formulae (X-1) to (X-16). At least one hydrogen atom contained in each structure may be replaced by a halogen atom, a methyl group, or an ethyl group.

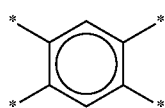
(X-1)

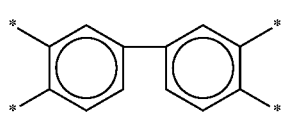
(X-2)

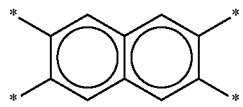
(X-3)

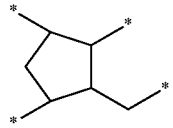
(X-4)

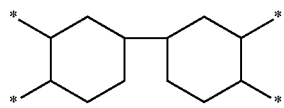
(X-5)

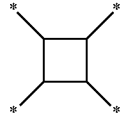
(X-6)

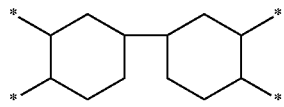
(X-7)

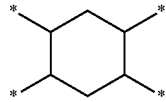
(X-8)

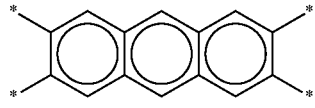
(X-9)

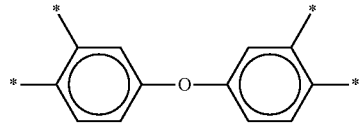
(X-10)

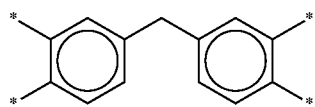
(X-11)

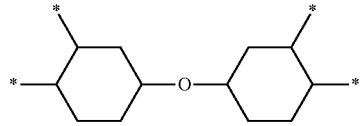
(X-12)

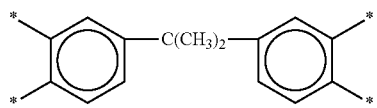
(X-13)

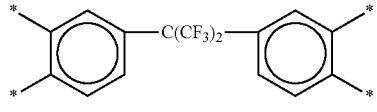
(X-14)

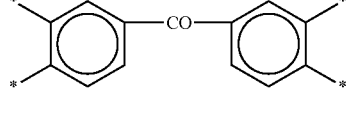
(X-15)

(X-16)

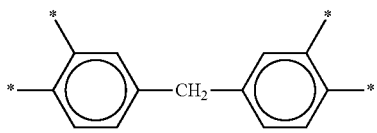

In each molecule of a polyamic acid containing a structure represented by the formula (PA-1), Xs may include one kind of structure or two or more different kinds of structures, and Bs may include one kind of structure or two or more different kinds of structures. Similarly, in each molecule of a polyimide containing a structure represented by the formula (PI-1), Xs may include one kind of structure or two or more different kinds of structures, and Bs may include one kind of structure or two or more different kinds of structures.

The polyamic acid in the present embodiment preferably contains at least one structure represented by the formula (PA-1) in one molecule. The polyamic acid in the present embodiment may contain only one structure represented by the formula (PA-1) in one molecule, or all the repeating units in one molecule may be a structure represented by the formula (PA-1). For the repeating units contained in one molecule of the polyamic acid in the present embodiment, 20 mol % or more and 80 mol % or less thereof is preferably a structure represented by the formula (PA-1). If the polyamic acid in the present embodiment contains a structure other than the structure represented by the formula (PA-1) in one molecule, the polyamic acid contains at least one structure represented by the formula (PA-2) mentioned below, for example.

The polyimide in the present embodiment preferably contains at least one structure represented by the formula (PI-1) in one molecule. The polyimide in the present embodiment may contain only one structure represented by the formula (PI-1) in one molecule, or all the repeating units in one molecule may be a structure represented by the formula (PI-1). For the repeating units contained in one molecule of the polyimide in the present embodiment, 20 mol % or more and 80 mol % or less thereof is preferably a structure represented by the formula (PI-1). If the polyimide in the present embodiment contains a structure other than the structure represented by the formula (PI-1) in one molecule, the polyimide contains at least one structure represented by the formula (PI-2) mentioned below, for example.

The alignment film of the present embodiment further contains a polymer that vertically aligns liquid crystal molecules (hereinafter, also referred to as a vertical alignment polymer) or a polymer that horizontally aligns liquid crystal molecules (hereinafter, also referred to as a horizontal alignment polymer). Such a structure enables phase separation of the polyamic acid and/or the polyimide and the vertical or horizontal alignment polymer, leading to formation of a bilayer vertical alignment film or a bilayer horizontal alignment film. In other words, such a structure allows the alignment film to include a lower layer containing the polyamic acid and/or the polyimide and an upper layer containing the vertical or horizontal alignment polymer. As a result, the lower layer can reduce dissolution of nitrogen gas, which is generated in the liquid crystal panel, in the liquid crystal layer and the upper layer can control the alignment azimuth of liquid crystal molecules. The term upper layer as used herein means the layer adjacent to the liquid crystal layer of the alignment film, while the term lower layer as used herein means the layer opposite to the liquid crystal layer of the alignment film.

The alignment film of the present embodiment preferably shows a ratio by weight between the sum (w1) of the amounts of the polyamic acid and the polyimide and the amount (w2) of the vertical alignment polymer or the horizontal alignment polymer (w1:w2) of 10:1 to 1:1, more preferably 6:1 to 2:1.

The vertical alignment polymer and the horizontal alignment polymer each preferably have a weight average molecular weight of 10,000 to 1,000,000, more preferably 30,000 to 200,000. With a weight average molecular weight within the above range, the polymer can be easily uniformly formed into a film with a desired thickness. With too low a weight average molecular weight, a film with a desired thickness is difficult to form. Too thick a film may fail to have a uniform thickness, possibly resulting in a significantly uneven surface. With too high a weight average molecular weight, a liquid crystal alignment agent may have too high a viscosity, possibly resulting in a failure in producing a film by, for example, an ink-jet technique.

As described above, the alignment film of the present embodiment may be subjected to rubbing treatment, but the vertical alignment polymer and the horizontal alignment polymer each preferably contain a photo-alignment functional group. Such a structure can eliminate generation of striped display unevenness and of static electricity which may occur when the alignment film used is one for rubbing treatment. Further, such a structure enables contactless alignment treatment, improving the alignment and alignment stability of the liquid crystal without impairment of components such as TFTs. When the vertical alignment polymer and the horizontal alignment polymer contain the photo-alignment functional group, the alignment of liquid crystal molecules is presumed to be controlled by a structure generated by a reaction of a photo-alignment functional group caused by light irradiation and by the molecular state, on the alignment film surface, of the vertical alignment polymer and the horizontal alignment polymer containing an unreacted photo-alignment functional group. Examples of the molecular state include the polymer conformation and the distribution of the structure generated by a reaction of a photo-alignment functional group caused by light irradiation and an unreacted photo-alignment functional group. There seem to be various reasons why an unreacted photo-alignment functional group remains in the vertical alignment polymer and the horizontal alignment polymer. For example, in the case of a cinnamate group, the presence of steric constraint (three-dimensional constraint in a molecule) in the resulting alignment film seems to be a reason.

The photo-alignment functional group preferably includes at least one group selected from the group consisting of cinnamate, azobenzene, coumarin, chalcone, and cyclobutane groups, and more preferably include a cinnamate group. The cinnamate group enables alignment treatment even without deep ultraviolet light, and thus can reduce impairment of molecules having a structure other than the photo-alignment functional group due to decomposition, for example. Further, the cinnamate group does not absorb visible light such as light from a backlight in practical use, and thus exhibits excellent long-term reliability. As described above, three-dimensional constraint in a molecule causes an unreacted cinnamate group to remain in the vertical alignment polymer and the horizontal alignment polymer.

The horizontal alignment polymer and the vertical alignment polymer each may or may not contain the bisaniline fluorene skeleton. A horizontal alignment polymer containing the bisaniline fluorene skeleton and a vertical alignment polymer containing the bisaniline fluorene skeleton may be the polymers represented by the formulae (PA-2) and (PI-2), respectively, in Embodiment 2 mentioned below.

The vertical alignment polymer and the horizontal alignment polymer each preferably contain at least one of the structures represented by the following respective formulae (PS-1) to (PS-3).

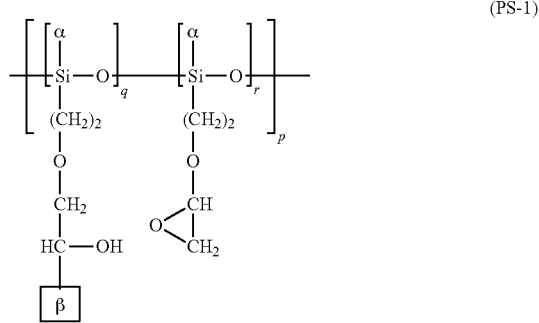

(PS-1)

In the formula (PS-1), αs are the same as or different from each other, and are each a hydrogen atom, a hydroxy group, or a C1-C5 alkoxy group; βs are the same as or different from each other, and are each a monovalent group containing a cinnamate group; and p, q, and r are each individually an integer of 1 or greater, with q and r satisfying $0<r/(q+r)<1$.

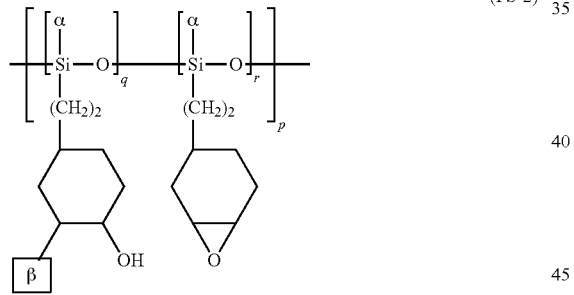

(PS-2)

In the formula (PS-2), αs are the same as or different from each other, and are each a hydrogen atom, a hydroxy group, or a C1-C5 alkoxy group; βs are the same as or different from each other, and are each a monovalent group containing a cinnamate group; and p, q, and r are each individually an integer of 1 or greater, with q and r satisfying $0<r/(q+r)<1$.

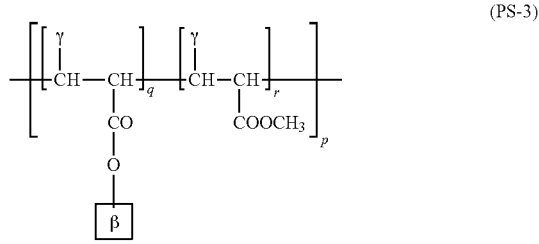

(PS-3)

In the formula (PS-3), βs are the same as or different from each other, and are each a monovalent group containing a cinnamate group; γs are the same as or different from each other, and are each a hydrogen atom or a C1-C5 alkyl group; and p, q, and r are each individually an integer of 1 or greater, with q and r satisfying $0<r/(q+r)<1$.

In each of the formulae (PS-1) and (PS-2), αs are the same as or different from each other, and are each a hydrogen atom, a hydroxy group, or a C1-C5 alkoxy group. Examples of the C1-C5 alkoxy group include $-OCH_3$, $-OC_2H_5$, $-OC_3H_7$, $-OC_4H_9$, and $-OC_5H_{11}$, and the C1-C5 alkoxy group may have either a linear structure or a branched structure. In the formulae (PS-1) and (PS-2), αs are each preferably a hydrogen atom, a hydroxy group, a methoxy group, or an ethoxy group.

In each of the formulae (PS-1), (PS-2), and (PS-3), βs are the same as or different from each other, and are each a monovalent group containing a cinnamate group. In the formulae (PS-1), (PS-2), and (PS-3), βs each preferably contain at least one of the structures represented by the following respective formulae (β-1) to (β-3).

(β-1)

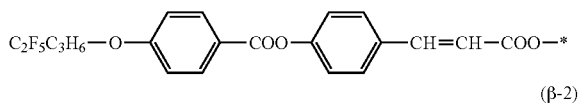

(β-2)

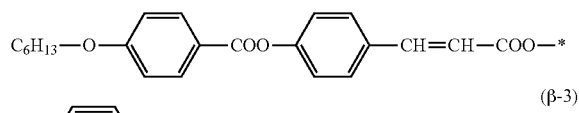

(β-3)

In the case of providing a vertical alignment film by photo-alignment treatment on the alignment film, βs in the formula (PS-1), βs in the formula (PS-2), and βs in the formula (PS-3) are the same as or different from each other, and each preferably contain at least one of the structures represented by the respective formulae (β-1) and (β-2). In the case of providing a horizontal alignment film by photo-alignment treatment on the alignment film, βs in the formula (PS-1), βs in the formula (PS-2), and βs in the formula (PS-3) each preferably contain the structure represented by the formula (β-3). The structures represented by the formulae (β-1) and (β-2) are each a structure contained in a polymer that vertically aligns liquid crystal molecules, while the structure represented by the formula (β-3) is a structure contained in a polymer that horizontally aligns liquid crystal molecules. At least part of each of the structures represented by the respective formulae (β-1) to (β-3) is a photo-alignment functional group (cinnamate group).

In the formula (PS-3), γs are the same as or different from each other, and are each a hydrogen atom or a C1-C5 alkyl group. Examples of the C1-C5 alkyl group include $-CH_3$, $-C_2H_5$, $-C_3H_7$, $-C_4H_9$, and $-O_5H_{11}$, and the C1-C5 alkyl group may have either a linear structure or a branched structure. γs in the formula (PS-3) are each preferably a hydrogen atom, a methyl group, or an ethyl group.

The expressions r/(q+r) in the formula (PS-1), r/(q+r) in the formula (PS-2), and r/(q+r) in the formula (PS-3) each satisfy $0<r/(q+r)<1$, preferably $0.40 \leq r/(q+r) \leq 0.95$, more preferably $0.50 \leq r/(q+r) \leq 0.90$. Not less than 10 mol % and not more than 50 mol % of β, which is a photo-alignment functional group, in other words, β in an amount satisfying 0.50≤r/(q+r)≤0.90, can both lead to the liquid crystal alignability and ensure the reliability by reducing the chance of impairment due to decomposition of photo-alignment functional groups, for example.

In each molecule of a polymer containing at least one structure represented by the formula (PS-1), αs may include one kind of structure or two or more different kinds of structures, and βs may include one kind of structure or two or more different kinds of structures. Similarly, in each molecule of a polymer containing at least one structure represented by the formula (PS-2), as may include one kind of structure or two or more different kinds of structures, and ps may include one kind of structure or two or more different kinds of structures. Similarly, in each molecule of a polymer containing at least one structure represented by the formula (PS-3), βs may include one kind of structure or two or more different kinds of structures, and γs may include one kind of structure or two or more different kinds of structures.

Embodiment 2

In the present embodiment, features unique to the present embodiment are mainly described and the same features as those of the above embodiment are not described hereinbelow. An alignment film of the present embodiment has the same structure as the alignment film of Embodiment 1, except that at least one selected from the group consisting of the polyamic acid containing a bisaniline fluorene skeleton and the polyimide containing a bisaniline fluorene skeleton is a polymer that vertically aligns liquid crystal molecules or a polymer that horizontally aligns liquid crystal molecules.

The alignment film of Embodiment 1 contains the vertical alignment polymer or the horizontal alignment polymer in addition to at least one selected from the group consisting of the polyamic acid and the polyimide, so that the alignment film is phase-separated into the lower layer containing at least one selected from the group consisting of the polyamic acid and the polyimide and the upper layer containing the vertical or horizontal alignment polymer. In contrast, in the alignment film of the present embodiment, at least one selected from the group consisting of the polyamic acid and the polyimide is a polymer that vertically aligns liquid crystal molecules or a polymer that horizontally aligns liquid crystal molecules. Such a structure can give both a function of reducing dissolution of nitrogen gas in the liquid crystal layer and a function of controlling the alignment of liquid crystal molecules to at least one selected from the group consisting of the polyamic acid and the polyimide, forming an alignment film in the form of monolayer.

At least one selected from the group consisting of the polyamic acid and the polyimide in the present embodiment preferably further contains a photo-alignment functional group. Such a structure can eliminate generation of striped display unevenness and of static electricity which may occur when the alignment film used is one for rubbing treatment. Further, such a structure enables contactless alignment treatment, improving the alignment and alignment stability of the liquid crystal without impairment of components such as TFTs.

The photo-alignment functional group preferably includes at least one group selected from the group consisting of cinnamate, azobenzene, coumarin, chalcone, and cyclobutane groups, and more preferably include a cinnamate group. The cinnamate group enables alignment treatment even without deep ultraviolet light, and thus can reduce impairment of molecules having a structure other than the photo-alignment functional group due to decomposition, for example. Further, the cinnamate group does not absorb visible light such as light from a backlight in practical use, and thus exhibits excellent long-term reliability.

The polyamic acid in the present embodiment preferably contains at least one structure represented by the following formula (PA-2), and the polyimide in the present embodiment preferably contains at least one structure represented by the following formula (PI-2).

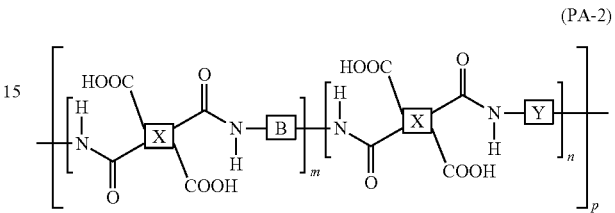

(PA-2)

In the formula (PA-2), Bs are the same as or different from each other, and are each a divalent group containing the structure represented by the formula (BAFL); Xs are the same as or different from each other, and are each a tetravalent group; Ys are the same as or different from each other, and are each a divalent group; and m, n, and p are each individually an integer of 1 or greater, with m and n satisfying 0<m/(m+n)<1.

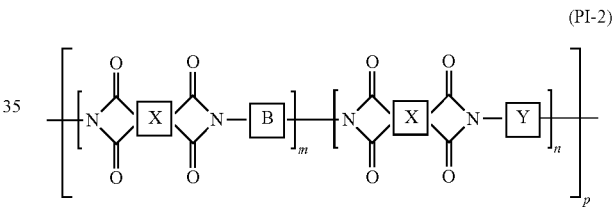

(PI-2)

In the formula (PI-2), Bs are the same as or different from each other, and are each a divalent group containing the structure represented by the formula (BAFL); Xs are the same as or different from each other, and are each a tetravalent group; Ys are the same as or different from each other, and are each a divalent group; and m, n, and p are each individually an integer of 1 or greater, with m and n satisfying 0<m/(m+n)<1.

Ys in the formula (PA-2) and Ys in the formula (PI-2) are the same as or different from each other, and are each a divalent group, more preferably a C4-C40 divalent group containing at least one selected from the group consisting of an aromatic group and an alicyclic group; still more preferably a C10-C40 divalent group containing an aromatic group and an alicyclic group, particularly preferably a divalent group containing a C6-C10 aromatic group and a C10-C30 alicyclic group. When two or more cyclic structures are present, they may be bonded directly or via a linking group, or may be condensed. Examples of the linking group include C1-C5 hydrocarbon, —O—, —N=N—, —C≡C—, —CH=CH—, and —CO—CH=CH— groups.

Specific examples of Y include chemical structures represented by the following respective formulae (Y-1) to (Y-42). At least one hydrogen atom contained in each structure may be replaced by a halogen atom, a methyl group, or an ethyl group.

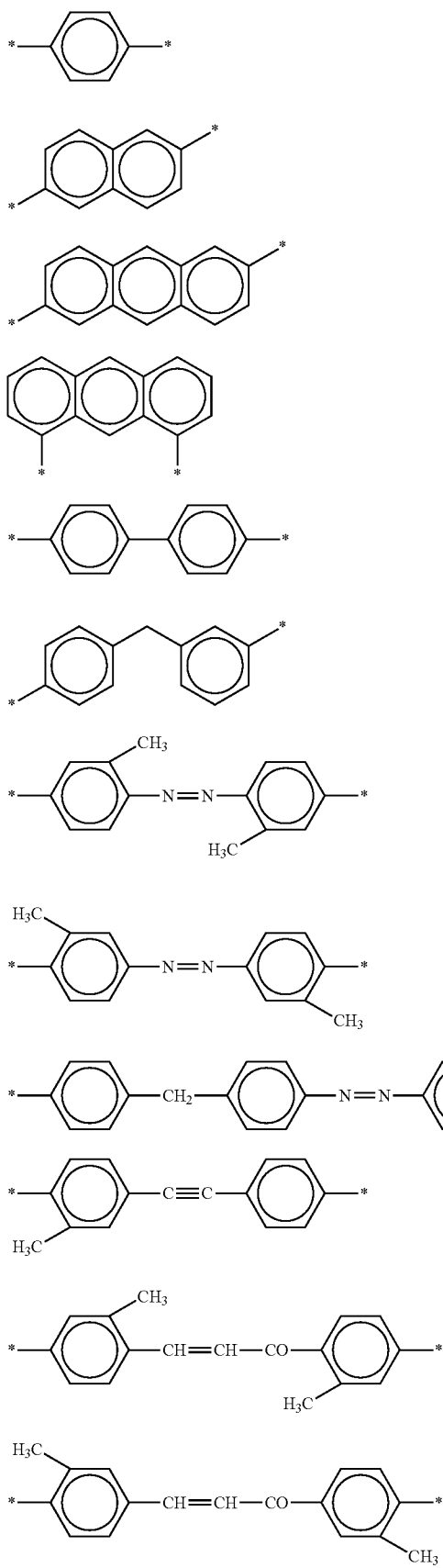
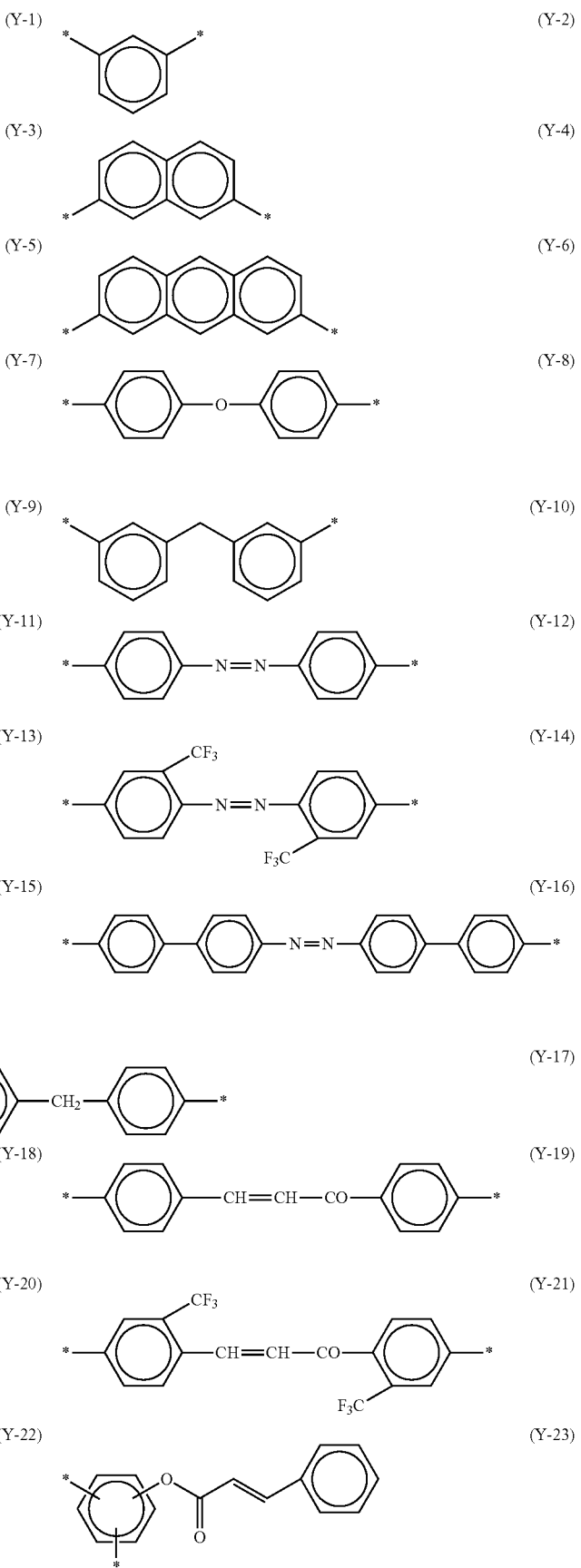

-continued
(Y-24)
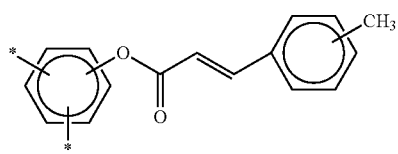
(Y-25)
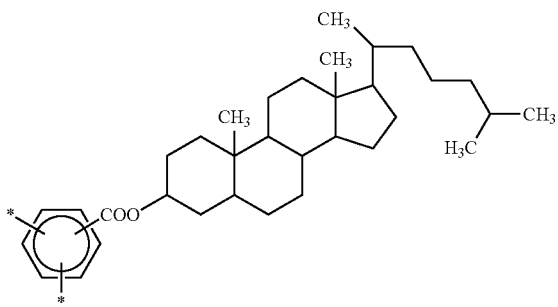
(Y-26)
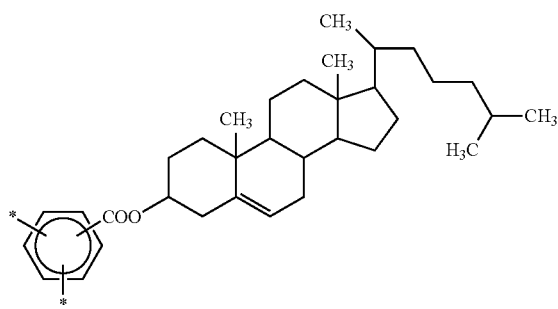
(Y-27)
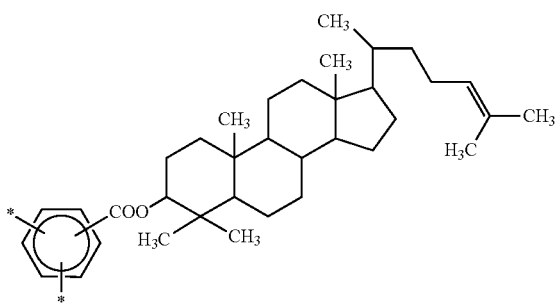
(Y-28)
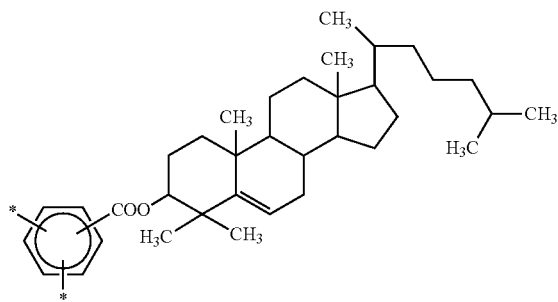
(Y-29)
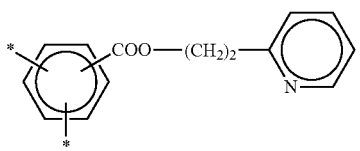
(Y-30)
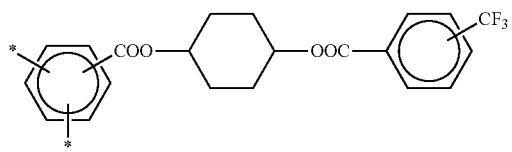
(Y-31)
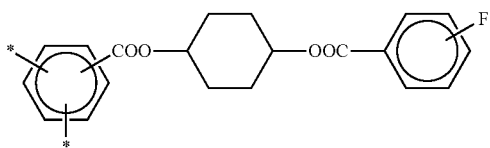
(Y-32)
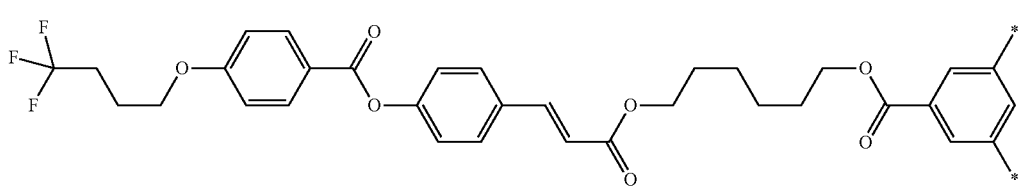

-continued
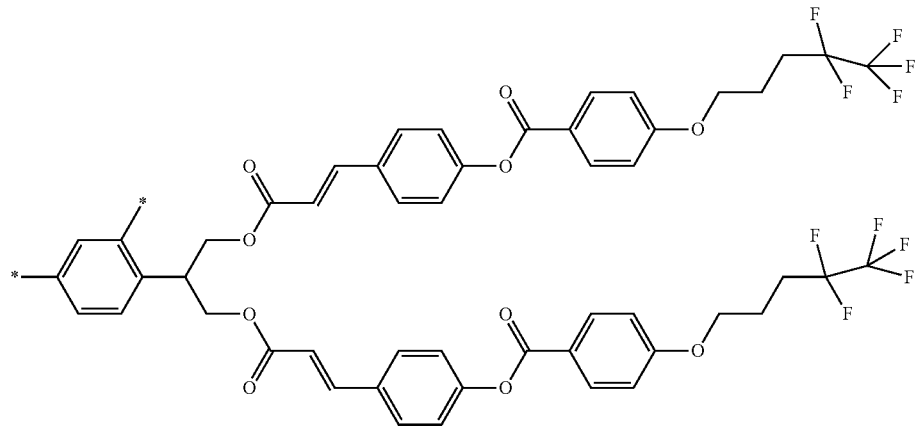
(Y-33)
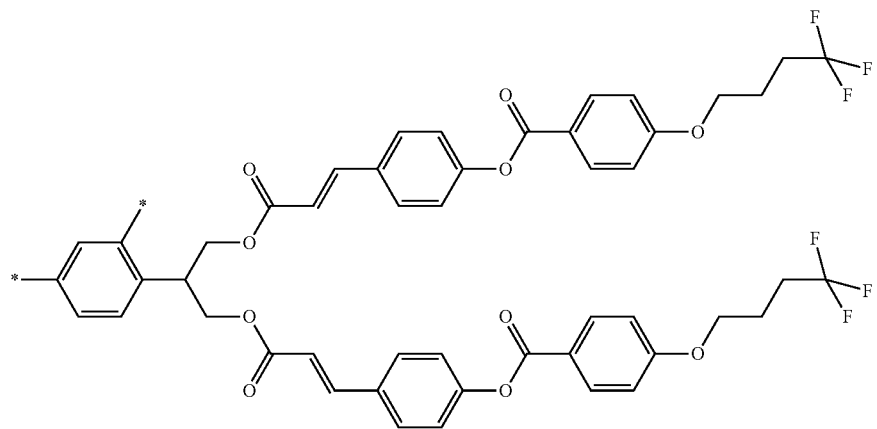
(Y-34)
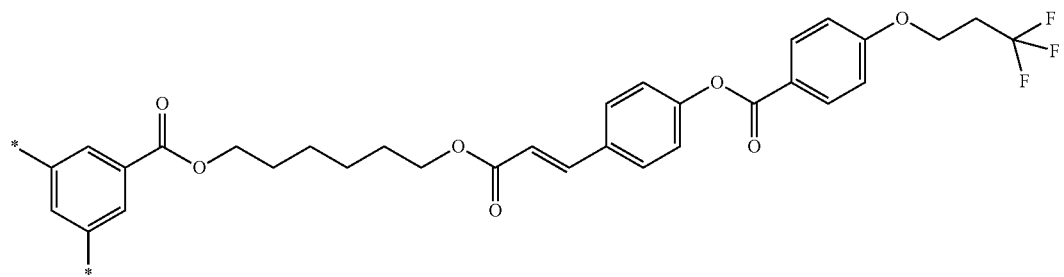
(Y-35)
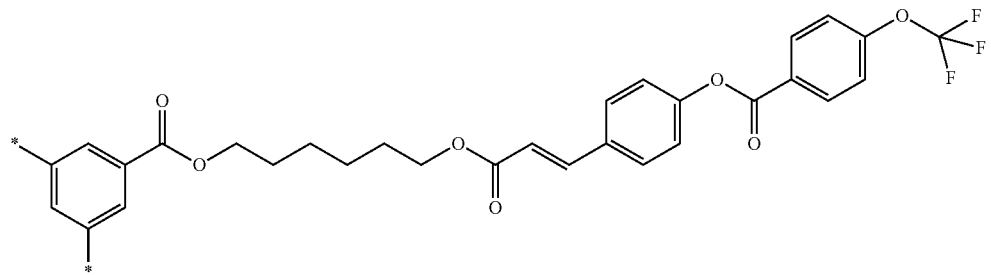
(Y-36)

-continued
(Y-37)
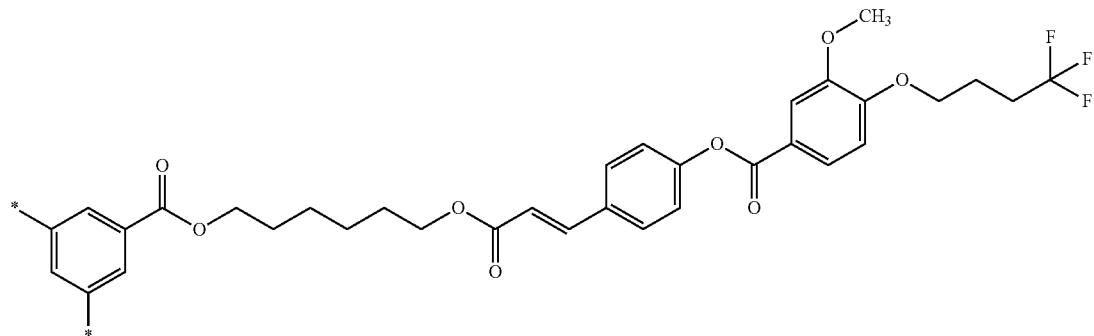
(Y-38)
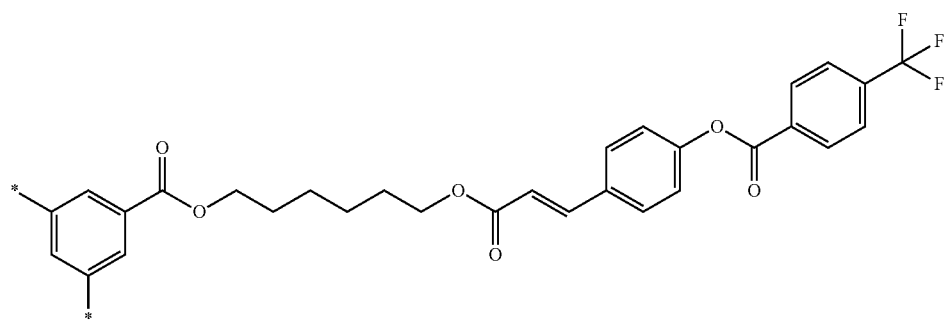
(Y-39)
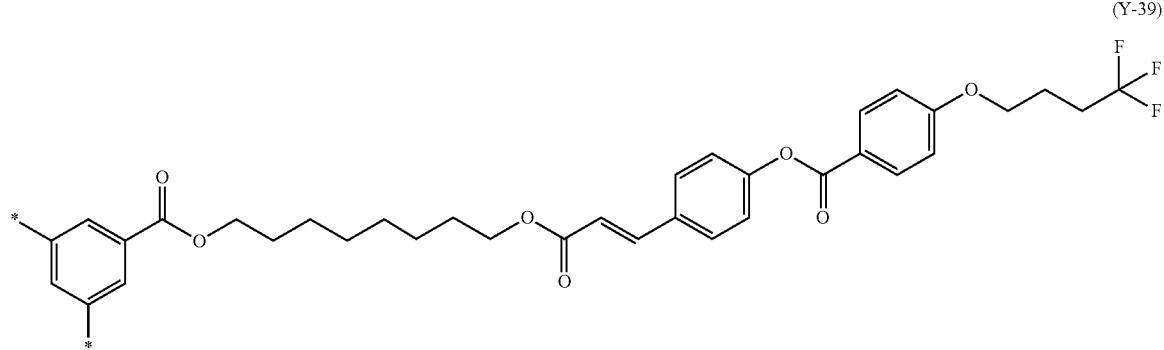
(Y-40)
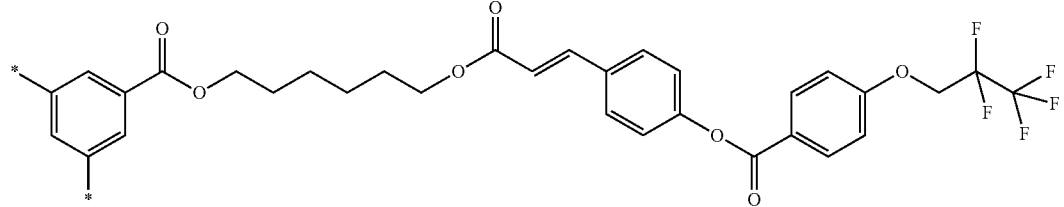
(Y-41)
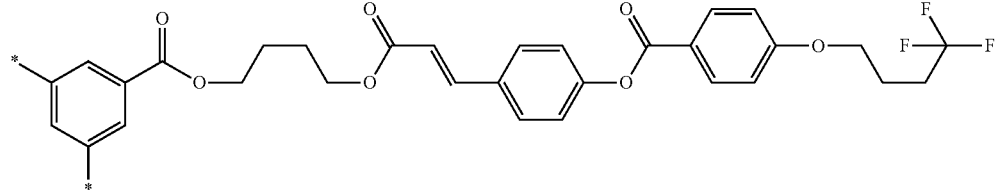

-continued

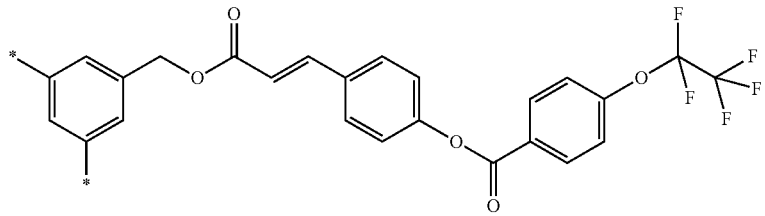

(Y-42)

In the case of providing a horizontal alignment film by rubbing treatment on the alignment film, Ys in the formulae (PA-2) and (PI-2) are each preferably a structure represented by any of the formulae (Y-1) to (Y-11). In the case of providing a horizontal alignment film by photo-alignment treatment on the alignment film, Ys in the formulae (PA-2) and (PI-2) are each preferably a structure represented by any of the formulae (Y-12) to (Y-24).

In the case of providing a vertical alignment film by rubbing treatment on the alignment film, Ys in the formulae (PA-2) and (PI-2) are each preferably a structure represented by any of the formulae (Y-25) to (Y-31). In the case of providing a vertical alignment film by photo-alignment treatment on the alignment film, Ys in the formulae (PA-2) and (PI-2) are each preferably a structure represented by any of the formulae (Y-32) to (Y-42).

The structures represented by the formulae (Y-1) to (Y-24) are each a structure contained in a polymer that horizontally aligns liquid crystal molecules, while the structures represented by the formulae (Y-25) to (Y-42) are each a structure contained in a polymer that vertically aligns liquid crystal molecules. At least part of each of the structures represented by the respective formulae (Y-12) to (Y-24) and (Y-32) to (Y-42) is a photo-alignment functional group.

The expressions m/(m+n) in the formula (PA-2) and m/(m+n) in the formula (PI-2) each represent a copolymerization ratio, and satisfy $0<m/(m+n)<1$, preferably satisfy $0.1 \leq m/(m+n) \leq 0.9$, more preferably satisfy $0.2 \leq m/(m+n) \leq 0.8$. Such a structure can achieve both adsorption of nitrogen gas on the alignment film and good liquid crystal alignability.

B, X, and p in the formulae (PA-2) and (PI-2) are defined in the same manner as B, X, and p in the formulae (PA-1) and (PI-1), including their preferred ranges.

In each molecule of a polyamic acid containing a structure represented by the formula (PA-2), Bs may include one kind of structure, or may include two or more different kinds of structures; Xs may include one kind of structure, or may include two or more different kinds of structures; and Ys may include one kind of structure, or may include two or more different kinds of structures. Similarly, in each molecule of a polyimide containing a structure represented by the formula (PI-2), Bs may include one kind of structure, or may include two or more different kinds of structures; Xs may include one kind of structure, or two or more different kinds of structures; and Ys may include one kind of structure, or may include two or more different kinds of structures.

Embodiment 3

In the present embodiment, features unique to the present embodiment are mainly described and the same features as those of the above embodiments are not described hereinbelow. A liquid crystal panel of the present embodiment includes any of the alignment films of the above embodiments.

Examples of the display (liquid crystal alignment) mode of the liquid crystal panel include the twisted nematic (TN) mode in which liquid crystal molecules having positive anisotropy of dielectric constant are aligned in a 90° twisted manner observed in the direction normal to the substrates, and the vertical alignment (VA) mode in which liquid crystal molecules having negative anisotropy of dielectric constant are aligned vertically to the substrate surfaces, as well as modes which can easily provide wide viewing angle characteristics and other characteristics, such as the in-plane switching (IPS) mode and the fringe field switching (FFS) mode in each of which liquid crystal molecules having positive or negative anisotropy of dielectric constant are aligned horizontally to the substrate surfaces and a transverse electric field is applied to the liquid crystal layer. In the present embodiment, any display mode may be used. A liquid crystal display panel taken as an example for the following description is a VA-mode liquid crystal panel, especially an ultra-violet induced multidomain vertical alignment-mode (UV2A-mode) liquid crystal panel in which a first substrate and a second substrate facing each other control the alignment of liquid crystal molecules in 90° different azimuths relative to each other.

FIG. 1 is a schematic cross-sectional view of a liquid crystal panel of Embodiment 3. As shown in FIG. 1, a liquid crystal panel 1 of the present embodiment includes a first substrate 10, a second substrate 20 facing the first substrate 10, and a liquid crystal layer 30 between the first substrate 10 and the second substrate 20.

The first substrate 10 includes an insulating substrate 11, a TFT layer 12, an interlayer insulation film 13, and planar pixel electrodes 14 disposed for the respective pixels, in the given order toward the liquid crystal layer 30. The first substrate 10 is also referred to as a TFT substrate.

The second substrate 20 includes an insulating substrate 21, a color filter layer 22 and a black matrix layer 23, and a common electrode 24, in the given order toward the liquid crystal layer 30. The second substrate 20 is also referred to as a CF substrate.

Between the first substrate 10 and the liquid crystal layer 30 are disposed an alignment film 40 and a polymer layer 60, and between the second substrate 20 and the liquid crystal layer 30 are disposed an alignment film 50 and a polymer layer 70, respectively from the first and second substrates 10 and 20 toward the liquid crystal layer 30.

A first polarizer (not shown) is disposed on the surface of the first substrate 10 opposite to the liquid crystal layer 30, and a second polarizer (not shown) is disposed on the surface of the second substrate 20 opposite to the liquid crystal layer 30. The first polarizer and the second polarizer are disposed in a crossed-Nicols state with the respective polarization axes crossed perpendicularly. Further, a backlight (not shown) is disposed on the outer side (the side opposite to the liquid crystal layer 30) of the second substrate 20.

Examples of the material of the insulating substrates 11 and 21 include, but are not limited to, any transparent substrates such as glass and plastic.

The TFT layer 12 includes scanning lines, data lines, and TFTs coupled with the respective scanning lines and data lines.

The interlayer insulation film 13 has a function of insulating the TFT layer 12 and the pixel electrodes 14. The interlayer insulation film 13 is also referred to simply as an insulation film. For example, the insulation film is formed from a positive resist patterned by a photolithographic process so as to establish communication between a TFT of the TFT layer 12 and the corresponding pixel electrode 14. The positive resist contains, for example, an insulation polymer such as an epoxy polymer, a novolac resin, and an NQD which is a photosensitizer for a positive resist. The interlayer insulation film 13 may have any function in addition to the above function. The interlayer insulation film 13 is preferably disposed on the entire display region of the liquid crystal panel 1, particularly at least the opening of each pixel.

The epoxy polymer (epoxy resin) may be any cured product of a pre-polymer containing an epoxy group. Examples of the pre-polymer containing an epoxy group include those commonly used in the field of positive resists. The pre-polymer containing an epoxy group may be a compound represented by the following formula (E):

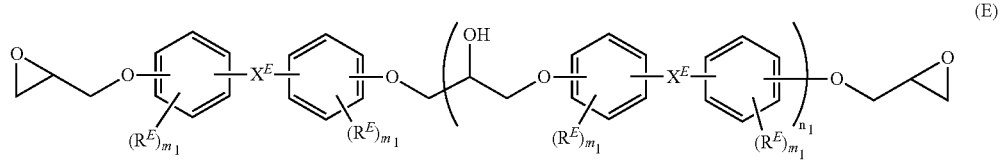

wherein $R^E$ is a —OH group, a halogen atom, a C1-C12 saturated alkyl or saturated alkoxy group, or a C2-C12 unsaturated alkyl or unsaturated alkoxy group; $X^E$ is —CH$_2$—, —CH(CH$_3$)—, or —O(CH$_3$)$_2$—; m1 is an integer of 1 to 4; n1 is an integer of 1 to 6; and $R^E$s may include one kind of structure or two or more different kinds of structures, and $X^E$s may include one kind of structure or two or more different kinds of structures.

Examples of the novolac resin include those commonly used in the field of positive resists. The novolac resin is preferably, but not limited to, one obtainable by condensation reaction of 1 mol of a phenol with 0.5 to 1.0 mol of a condensation agent, such as an aldehyde, in the presence of an acidic catalyst.

Examples of the phenol include phenol; cresols such as o-cresol, m-cresol, and p-cresol; xylenols such as 2,3-xylenol, 2,4-xylenol, 2,5-xylenol, 2,6-xylenol, 3,4-xylenol, and 3,5-xylenol; alkylphenols such as ethylphenols (e.g., o-ethylphenol, m-ethylphenol, and p-ethylphenol), 2-isopropylphenol, 3-isopropylphenol, 4-isopropylphenol, o-butylphenol, m-butylphenol, p-butylphenol, and p-tert-butylphenol; trialkylphenols such as 2,3,5-trimethylphenol and 3,4,5-trimethylphenol; polyhydric phenols such as resorcinol, catechol, hydroquinone, hydroquinone monomethyl ether, pyrogallol, and phloroglucinol; alkyl polyhydric phenols such as alkyl resorcin, alkyl catechol, and alkyl hydroquinone (each of the alkyl groups has a carbon number of 1 to 4); α-naphthol, β-naphthol, hydroxydiphenyl, and bisphenol A. These phenols may be used alone or in combination of two or more.

Examples of the condensation agent include aldehydes and ketones. Preferred are aldehydes, particularly formaldehyde and paraformaldehyde.

An example of the novolac resin is a compound represented by the following formula (NB).

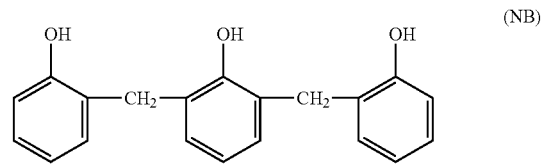 [SMILES: Oc1ccccc1Cc1cccc(Cc2ccccc2O)c1O]

The interlayer insulation film 13 preferably contains at least one selected from the group consisting of a positive resist and a photo-reaction product thereof. The cases where the interlayer insulation film 13 contains a positive resist and does not contain a photo-reaction product thereof include, for example, a case where all the photo-sensitive moieties (e.g., naphthoquinone diazide groups of NQD) contained in a positive resist remain unreacted in the interlayer insulation film 13. The cases where the interlayer insulation film does not contain a positive resist but contains a photo-reaction product thereof include, for example, a case where all the photo-sensitive moieties contained in the positive resist are converted into photo-reaction products by light irradiation and remain in the interlayer insulation film 13. The cases where the interlayer insulation film contains both a positive resist and a photo-reaction product thereof include, for example, a case where some of the photo-sensitive moieties contained in the positive resist are converted into photo-reaction products by light irradiation and both the unreacted moieties of the positive resist and the photo-reaction products are contained in the interlayer insulation film 13. In the liquid crystal panel 1, a photo-reaction product of the positive resist seems to be easily generated by the influence of light irradiation in an opening region where no light-shielding member such as black matrix is disposed, while the positive resist seems to be likely to remain unreacted in a light-shielding region where a light-shielding member is disposed.

The positive resist preferably contains a naphthoquinone diazide compound (NQD). The NQD is a highly reactive compound for positive resists containing a naphthoquinone diazide group (1,2-naphthoquinone diazide group) which is a photo-sensitive moiety. Thus, when the interlayer insulation film 13 is patterned and the TFTs and the respective pixel electrodes 14 are brought into contact with each other, NQD can reduce occurrence of defects due to contact failure between the TFTs and the respective pixel electrodes 14.

The NQD is preferably a compound containing a naphthoquinone diazide group represented by the following formula (N1).

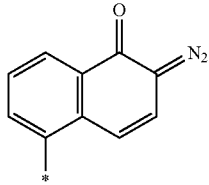

(N1)

Examples of the NQD include compounds derived from a variety of polyhydric phenols in which at least one hydroxy group is replaced by a group containing the naphthoquinone diazide group; and polymers containing the naphthoquinone diazide group. Examples of the polymers include, but are not limited to, network polymers. In the present embodiment, the NQD is described as a material different from the novolac resin. Still, the NQD may be a compound derived from a novolac resin in which some of phenolic hydroxy groups are replaced by naphthoquinone diazide groups, in other words, a novolac resin containing naphthoquinone diazide groups. In this case, the positive resist may not contain a novolac resin in addition to an NQD.

The NQD is more preferably a compound containing a group (1,2-naphthoquinonediazide-5-sulfonyl group) represented by the following formula (N2) which contains the naphthoquinone diazide group represented by the formula (N1).

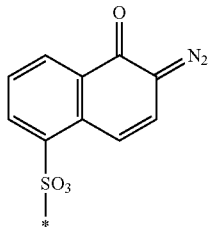

(N2)

When an NQD is irradiated with light such as ultraviolet light, the NQD generates nitrogen gas, and then generates an indenecarboxylic acid, which is a photo-reaction product of NQD, in accordance with the reaction scheme shown in the formula 1.

In the liquid crystal panel 1 of the present embodiment, an electric field can be generated in the liquid crystal layer 30 by applying voltage to between the paired electrodes consisting of a pixel electrode 14 and the common electrode 24. Thus, the alignment of liquid crystal molecules in the liquid crystal layer 30 can be controlled by adjusting the voltage applied between a pixel electrode 14 and the common electrode 24.

Examples of the materials of the pixel electrodes 14 and the common electrode 24 include indium tin oxide (ITO) and indium zinc oxide (IZO).

The color filter layer 22 is a color filter layer commonly used in the field of liquid crystal panels, and includes color filters of multiple colors. The color filter layer 22 in the present embodiment includes a red color filter, a green color filter, and a blue color filter. In addition to these color filters, another color filter such as a yellow color filter may also be used.

The black matrix layer 23 is a black matrix layer commonly used in the field of liquid crystal panels, and has a function of blocking light from a backlight provided for the liquid crystal panel 1 and light from the outside.

The liquid crystal layer 30 contains liquid crystal molecules. The liquid crystal panel 1 of the present embodiment can control the amount of light to be passed therethrough by applying voltage to the liquid crystal layer 30 and changing the alignment of liquid crystal molecules in accordance with the voltage applied.

Each of the alignment films 40 and 50 is any of the alignment films of the above embodiments. Thus, even when the interlayer insulation film 13 contains at least one selected from the group consisting of the positive resist (particularly NQD) and a photo-reaction product thereof, such a structure can reduce permeation of nitrogen gas generated in the liquid crystal panel 1 through the alignment film 40 and dissolution of the nitrogen gas in the liquid crystal layer 30, reducing generation of bubbles in the liquid crystal layer 30. In the present embodiment, the alignment films 40 and 50 are respectively disposed on the first substrate 10 and the second substrate 20. Alternatively, if an interlayer insulation film containing at least one selected from the group consisting of the positive resist and a photo-reaction product thereof is disposed on at least one selected from the group consisting of the first substrate 10 and the second substrate 20, the alignment film of the present embodiment may be disposed only on such a substrate.

The polymer layers 60 and 70 have a function of controlling the alignment of liquid crystal molecules contained in the liquid crystal layer 30. Thus, the presence of the polymer layers 60 and 70 enables regulation of the initial alignment of liquid crystal molecules not only by the alignment films 40 and 50 but also by the polymer layers 60 and 70.

The polymer layers 60 and 70 may be formed from a liquid crystal material containing a polymerizable monomer in formation of the liquid crystal layer 30, for example. Such a technique of forming the polymer layers 60 and 70 is also referred to as a polymer sustained alignment (PSA) technique. In the PSA technique, specifically, the liquid crystal material containing a polymerizable monomer is sealed between the first substrate 10 and the second substrate 20; the polymerizable monomer is polymerized to form a polymer; and the polymer is phase-separated, so that the polymer layers 60 and 70 are respectively formed on the surfaces of the alignment films 40 and 50.

The polymerizable monomer used for formation of the polymer layers 60 and 70 preferably contains at least one structure (monomer) represented by the following formula (M1):

(M1)

wherein $P^1$ is a radical polymerizable group;
$Sp^1$ is a C1-C6 linear, branched, or cyclic alkylene group, a C1-C6 linear, branched, or cyclic alkyleneoxy group, or a direct bond;
$R^2$ is a —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$), CF$_2$O—, —OCF$_2$—, CF$_2$S, —SCF$_2$—, —N(CF$_3$), —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, or —OCO—CH=CH— group, or a direct bond;

Z is a —O—, —S—, —NH—, —COO—, —OCO—, —O—COO—, —OCH$_2$—, —CH$_2$O—, —SCH$_2$—, —CH$_2$S—, —N(CH$_3$)—, —N(O$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CF$_2$CF$_2$—, —CH=CH—, —CF=CF—, —C≡C—, —CH=CH—COO—, or —OCO—CH=CH— group, or a direct bond;

R$^3$ is a —R$^2$—Sp$^1$-P$^1$ group, a hydrogen atom, a halogen atom, or a —CN, —NO$_2$, —NCO, —NCS, —OCN, —SCN, —SF$_5$, or C1-C18 linear or branched alkyl group;

A$^1$ and A$^2$ are each individually a 1,2-phenylene, 1,3-phenylene, 1,4-phenylene, naphthalene-1,4-diyl, naphthalene-1,5-diyl, naphthalene-2,6-diyl, decahydronaphthalene-2,6-diyl, 1,2,3,4-tetrahydronaphthalene-2,6-diyl, phenanthrene-1,6-diyl, phenanthrene-1,8-diyl, phenanthrene-2,7-diyl, phenanthrene-3,6-diyl, anthracene-1,5-diyl, anthracene-1,8-diyl, anthracene-2,6-diyl, or anthracene-2,7-diyl group;

n is 0, 1, or 2;

a hydrogen atom in R$^3$ may be replaced by a fluorine atom or a chlorine atom; a —CH$_2$— group in R$^3$ may be replaced by a —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, or —OCO—CH=CH— group, unless an oxygen atom and a sulfur atom are adjacent to each other;

—CH$_2$— groups in A$^1$ and A$^2$ may be replaced by a —O— group or a —S— group unless these groups are adjacent to each other; one or two or more hydrogen atoms in A$^1$ and A$^2$ may be replaced by a fluorine atom, a chlorine atom, or a —CN, C1-C6 alkyl, C1-C6 alkoxy, C2-C6 alkylcarbonyl, C2-C6 alkoxycarbonyl, or C2-C6 alkylcarbonyloxy group.

P$^1$ in the formula (M1) is a radical polymerizable group. Examples of the radical polymerizable group include acrylate, methacrylate, acrylamide, methacrylamide, vinyl, and vinyloxy groups. In order to increase the reaction rate, an acrylate, acrylamide, vinyl, or vinyloxy group is preferred. In order to improve the rigidity of the polymer layer to stabilize the tilt angle, a methacrylate or methacrylamide group is preferred.

A polymerizable monomer containing at least one structure represented by the formula (M1) is preferably a monomer containing phenanthrene having a developed fused-ring structure. A$^1$ and A$^2$ in the formula (M1) are each individually more preferably a phenanthrene-1,6-diyl, phenanthrene-1,8-diyl, phenanthrene-2,7-diyl, or phenanthrene-3,6-diyl group.

A polymerizable monomer containing at least one structure represented by the formula (M1) is preferably a polymerizable monomer containing at least one of the structures represented by the following respective formulae (M1-1) to (M1-3).

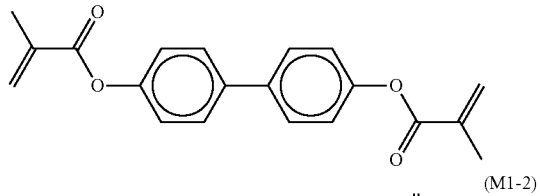
(M1-1)

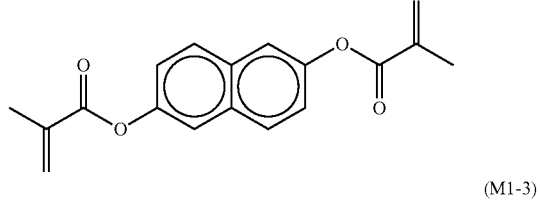
(M1-2)

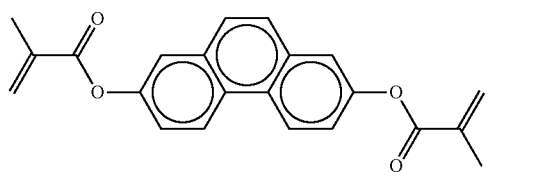
(M1-3)

Embodiment 4

In the present embodiment, features unique to the present embodiment are mainly described and the same features as those of the above embodiments are not described hereinbelow. In the above embodiments, a VA-mode liquid crystal panel is taken as an example. In the present embodiment, an FFS-mode liquid crystal panel is taken as an example for the following description.

Figure 2:
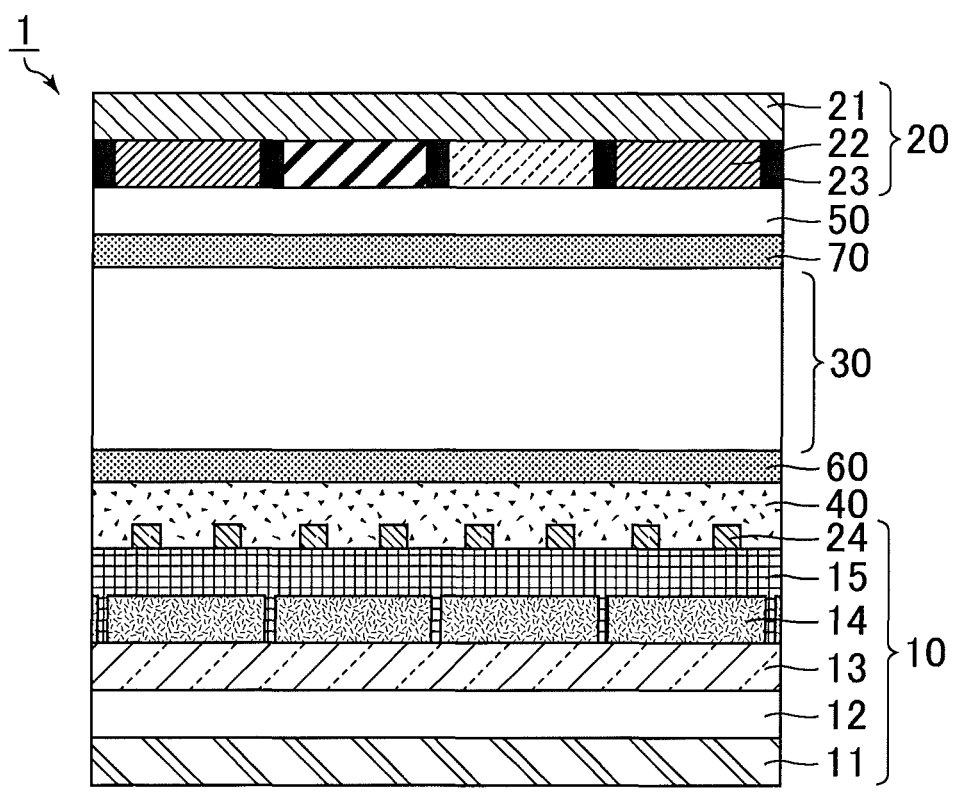
FIG. 2 is a schematic cross-sectional view of a liquid crystal panel of Embodiment 4.

FIG. 2 is a schematic cross-sectional view of a liquid crystal panel of Embodiment 4. As shown in FIG. 2, in the present embodiment, the first substrate 10 includes the insulating substrate 11, the TFT layer 12, the interlayer insulation film 13, the planar pixel electrodes 14 disposed for the respective pixels, a second insulation film 15, and a comb-shaped common electrode 24 with slits, in the given order toward the liquid crystal layer 30. The first substrate 10 is also referred to as a TFT substrate. The position of the pixel electrodes 14 and the position of the common electrode 24 may be switched each other, and the pixel electrodes 14 in a comb shape with slits may be disposed for the respective pixels on the liquid crystal layer 30 side of the common electrode 24 in a planar shape.

In the present embodiment, the common electrode 24 is disposed above the pixel electrodes 14 with the second insulation film 15 in between. The second insulation film 15 may be an inorganic film (relative permittivity ε=5 to 7) of silicon nitride (SiN$_x$) or silicon oxide (SiO$_2$), or a multilayer film thereof.

Embodiment 5

In the present embodiment, features unique to the present embodiment are mainly described and the same features as those of the above embodiments are not described hereinbelow. In the present embodiment, a method for producing the liquid crystal panel 1 of Embodiment 3 is described.

As described below, the TFT substrate which is the first substrate 10 and the CF substrate which is the second substrate 20 can be produced by known production techniques.

The first substrate 10 and the alignment film 40 can be produced through formation of a TFT layer, formation of an interlayer insulation film, formation of pixel electrodes, and formation of an alignment film. The respective steps are described in detail below.

In the formation of a TFT layer, first, scanning lines, data lines, and TFTs are formed on the insulating substrate 11. TFT-forming materials such as the scanning lines, the data lines, thin-film semiconductors, gate electrodes constituted by part of the scanning lines, source electrodes constituted by part of the data lines, and drain electrodes coupled with the respective pixel electrodes 14 are formed by sputtering, chemical vapor deposition (CVD), or another technique, and then patterned into a desired pattern by photolithography, for example.

Next, in the formation of an interlayer insulation film, a resist film is formed from a positive resist material above the TFT layer 12. Further, the resist film is exposed to light and developed using a photomask, so that the interlayer insulation film (insulation film (positive resist)) 13 with a desired pattern is formed. The positive resist material may be a composition containing an insulation polymer such as an epoxy polymer, a novolac resin, and an NQD which is a photosensitizer for positive resists, for example.

Next, in the formation of pixel electrodes, a transparent conductive film which is to constitute the pixel electrodes 14 is formed by sputtering, for example, above the interlayer insulation film 13, and then patterned into a planar pattern. As a result, the TFT substrate which is the first substrate 10 can be produced.

In the formation of an alignment film following the patterning of the pixel electrodes 14, a liquid crystal alignment agent containing at least one selected from the group consisting of the polyamic acid and the polyimide is applied to the substrate by an ink-jet technique. The solvent is removed and the residue is baked for imidization, and then the film is subjected to rubbing or photo-alignment so as to give alignment-regulating force and align liquid crystal molecules in a certain direction. As a result, the alignment film 40 is formed on the first substrate 10. The liquid crystal alignment agent may alternatively be applied by a roll coat method.

The second substrate 20 and the alignment film 50 can be produced through formation of a black matrix layer, formation of a color filter layer, formation of a common electrode, and formation of an alignment film. The respective steps are described in detail below.

In the formation of a black matrix layer, first, the black matrix layer 23 is formed on the insulating substrate 21, and then patterned into a desired matrix pattern by photolithography, for example.

Next, in the formation of a color filter layer, red, green, and blue resist materials of the color filter layer 22 are successively applied to the substrate by spin coating, slit coating, or another technique, and then patterned by photolithography, for example.

In the formation of a common electrode following the formation of the color filter layer, a transparent conductive film which is to constitute the common electrode 24 is formed by sputtering, for example, above the color filter layer 22 and the black matrix layer 23, and then patterned in a desired shape. As a result, the CF substrate which is the second substrate 20 can be produced.

Then, in the formation of an alignment film, similar to the case of the alignment film 40 disposed on the first substrate 10, a liquid crystal alignment agent containing at least one selected from the group consisting of the polyamic acid and the polyimide is applied to the substrate by an ink-jet technique. The solvent is removed and the residue is baked for imidization, and then the film is subjected to rubbing or photo-alignment so as to give alignment-regulating force and align liquid crystal molecules in a certain direction. As a result, the alignment film 50 is formed on the second substrate 20. The liquid crystal alignment agent may alternatively be applied by a roll coat method.

A sealant is applied to the first substrate 10 or the second substrate 20 produced as described above, and a liquid crystal material containing a liquid crystal compound and a polymerizable monomer is filled into the region surrounded by the sealant, so that the liquid crystal layer 30 is formed. Then, the first substrate 10 and the second substrate 20 are attached via the sealant. The liquid crystal layer 30 is irradiated with ultraviolet light so that the polymerizable monomer is polymerized to form a polymer, and then the polymer is phase-separated, whereby the polymer layers 60 and 70 are formed. The ultraviolet light used is non-polarized light. Further, the reaction of forming the polymer layers 60 and 70 by irradiating the liquid crystal layer 30 with ultraviolet light is a diffusion-controlled reaction. The duration of ultraviolet light irradiation in the formation of the polymer layers 60 and 70 may preferably be 200 minutes or shorter, more preferably 120 minutes or shorter. Longer than 200 minutes of ultraviolet irradiation may cause photo-decomposition of liquid crystal molecules and/or the alignment films 40 and 50, resulting in reduced reliability. As a result, the liquid crystal panel 1 of Embodiment 3 can be produced.

Embodiment 6

In the present embodiment, features unique to the present embodiment are mainly described and the same features as those of the above embodiments are not described hereinbelow. In the present embodiment, a method for producing the liquid crystal panel 1 of Embodiment 4 is described.

The liquid crystal panel 1 of Embodiment 4 can be produced in the same manner as in the method for producing a liquid crystal panel of Embodiment 5, except that the common electrode 24 is not disposed on the second substrate 20, and that the second insulation film 15 is formed on the pixel electrodes 14 which are disposed on the first substrate 10 and then the common electrode 24 with a comb-shaped slit pattern is formed.

The present invention is described below in more detail based on examples and comparative examples. The examples, however, are not intended to limit the scope of the present invention.

Example 1 and Comparative Example 1

(Preparation of Liquid Crystal Alignment Agent)

A polymer represented by the following formula (PA-11) (a polyamic acid containing a bisaniline fluorene skeleton) and a polymer represented by the following formula (PS-11) (a polymer that vertically aligns liquid crystal molecules and contains a cinnamate group which is a photo-alignment functional group) were dissolved in a solvent mixture of N-methylpyrrolidone (hereinafter, also referred to as NMP) and γ-butyrolactone so as to give a ratio by weight of 4:1, in other words, (the weight of the polymer represented by the following formula (PA-11)):(the weight of the polymer represented by the following formula (PS-11))=4:1. Thereby, a liquid crystal alignment agent 1A having a solid concentration of 5 wt % was prepared.

Also, a polymer represented by the following formula (PAR-11) and the polymer represented by the following formula (PS-11) were dissolved in a solvent mixture of NMP and γ-butyrolactone so as to give a ratio by weight of 4:1, in other words, (the weight of the polymer represented by the following formula (PAR-11)):(the weight of the polymer represented by the following formula (PS-11))=4:1. Thereby, a liquid crystal alignment agent 1R having a solid concentration of 5 wt % was prepared.

The polymer represented by the following formula (PA-11), the polymer represented by the following formula (PS-11), and the polymer represented by the following formula (PAR-11) each had a weight average molecular weight of 10,000 or higher and 50,000 or lower.

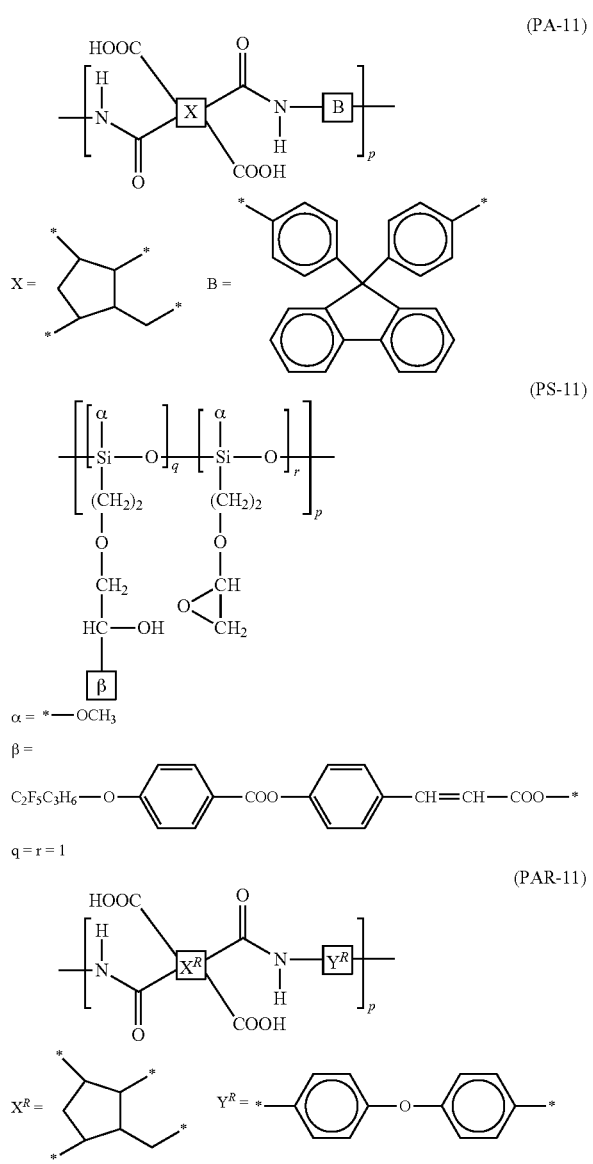

(Production of Liquid Crystal Panel)

A positive resist material containing an insulation polymer (epoxy polymer), a novolac resin, and an NQD which is a photosensitizer for positive resists was prepared. The positive resist material was applied in the form of a film on an insulating substrate by spin coating and the solvent was removed by heating. Then, the workpiece was irradiated with 5 J/cm$^2$ of non-polarized ultraviolet light, whereby an interlayer insulation film (positive resist) was formed. Further, ITO pixel electrodes were stacked on the interlayer insulation film, whereby a first substrate was produced. The interlayer insulation film contained the insulation polymer (epoxy polymer), the novolac resin, and the NQD which is a photosensitizer for positive resists. Subsequently, an ITO common electrode and a color filter layer were formed in the given order on the insulating substrate. Thereby, a second substrate was produced.

The liquid crystal alignment agent 1A was applied to the first substrate and the second substrate. The workpieces were pre-baked at 80° C. for two minutes, then baked at 230° C. for 40 minutes, and subsequently irradiated with 25 mJ/cm$^2$ of polarized ultraviolet light. Next, a sealant was applied to the first substrate, and a liquid crystal material (Tni 75° C., Δε=−3.0, Δn=0.095) having negative anisotropy of dielectric constant was dropped on the first substrate. The second substrate was attached thereto such that the first substrate and the second substrate control the alignment of liquid crystal molecules in 90° different azimuths relative to each other. The sealant used was a thermosetting one or a ultraviolet-curable one, or both of these sealants were used. Next, the temperature of the liquid crystal panel was increased up to Tni (110° C.) or higher and annealed for 30 minutes, so that re-alignment treatment was performed. Thereby, a UV2A-mode liquid crystal panel of Example 1 was obtained. A UV2A-mode liquid crystal panel of Comparative Example 1 was obtained in the same manner as in the case of the liquid crystal panel of Example 1, except that the liquid crystal alignment agent 1A was replaced by the liquid crystal alignment agent 1R. The alignment films were formed by baking the applied liquid crystal alignment agents 1A and 1R at 230° C. Thus, the polymer (polyamic acid) represented by the formula (PA-11) and the polymer (polyamic acid) represented by the formula (PAR-11) were partially converted into a polyimide. In other words, the alignment films of the liquid crystal panel of Example 1 contain a polyimide formed by partial imidization of the polymer represented by the formula (PA-11) and the alignment films of the liquid crystal panel of Comparative Example 1 contain a polyimide formed by partial imidization of the polymer represented by the formula (PAR-11).

(Ultraviolet Irradiation Test)

The resulting liquid crystal panels were irradiated with ultraviolet light (high-pressure mercury lamp) in a 25° C. environment for one hour, and generation of bubbles in each liquid crystal panel (liquid crystal layer) was checked. The results are shown in Table 1.

TABLE 1

|  | Alignment film | High-pressure mercury lamp irradiation Time until bubble generation |
|---|---|---|
| Example 1 | (PA-11) + (PS-11) | None (bubbles generated after irradiation for 4 h) |
| Comparative Example 1 | (PAR-11) + (PS-11) | 0.5 h |

The liquid crystal panel of Example 1 that contains a polyimide containing a bisaniline fluorene skeleton (a polyimide formed by partial imidization of the polymer represented by the formula (PA-11)) in the alignment films did not cause generation of bubbles even after irradiated with light from the high-pressure mercury lamp for one hour. Irradiation of the liquid crystal panel with light from the mercury lamp presumably causes generation of $N_2$ gas due to a photo-reaction of the NQD in the interlayer insulation film. Nevertheless, no generation of bubbles was observed in the liquid crystal layer of the liquid crystal panel of Example 1. Thus, the polyimide containing a bisaniline fluorene skeleton in the alignment films seems to reduce permeation of $N_2$ gas, preventing dissolution of the $N_2$ gas in the liquid crystal layer. As the liquid crystal panel of Example 1 was continuously irradiated with light from the high-pressure mercury lamp for four hours, generation of bubbles was observed.

In contrast, the liquid crystal panel of Comparative Example 1 that contains neither a polyamic acid containing a bisaniline fluorene skeleton nor a polyimide containing a bisaniline fluorene skeleton in the alignment films caused generation of bubbles in the liquid crystal layer of the liquid crystal panel after irradiated with light from the high-pressure mercury lamp for 0.5 hours. This is presumably because $N_2$ gas generated from the NQD permeated the alignment film, dissolving in the liquid crystal layer.

The above results show that the presence of a polyimide containing a bisaniline fluorene skeleton in an alignment film can reduce generation of bubbles in the liquid crystal layer even when an interlayer insulation film containing a photosensitizer is present.

Examples 2 and Comparative Example 2

(Production of Liquid Crystal Panel)

A positive resist material containing an insulation polymer (epoxy polymer), a novolac resin, and an NQD which is a photosensitizer for positive resists was prepared. The positive resist material was applied in the form of a film on an insulating substrate by spin coating and the solvent was removed by heating. Then, the workpiece was irradiated with 5 J/cm$^2$ of non-polarized ultraviolet light, whereby an interlayer insulation film (positive resist) was formed. Further, ITO pixel electrodes were stacked on the interlayer insulation film, whereby a first substrate was produced. The interlayer insulation film contained the insulation polymer (epoxy polymer), the novolac resin, and the NQD which is a photosensitizer for positive resists. Subsequently, an ITO common electrode and a color filter layer were formed in the given order on the insulating substrate. Thereby, a second substrate was produced.

The liquid crystal alignment agent 1A was applied to the first substrate and the second substrate. The workpieces were pre-baked at 80° C. for two minutes, then baked at 230° C. for 40 minutes, and subsequently irradiated with 20 mJ/cm$^2$ of polarized ultraviolet light. Next, a sealant was applied to the first substrate, and a liquid crystal material (Tni 75° C., $\Delta\varepsilon=-3.0$, $\Delta n=0.095$) having negative anisotropy of dielectric constant and containing 0.6 wt % of a compound represented by the following formula (M1-3) was dropped on the first substrate. The second substrate was attached thereto such that the first substrate and the second substrate control the alignment of liquid crystal molecules in 90° different azimuths relative to each other. The sealant used was a thermosetting one or an ultraviolet-curable one, or both of these sealants were used.

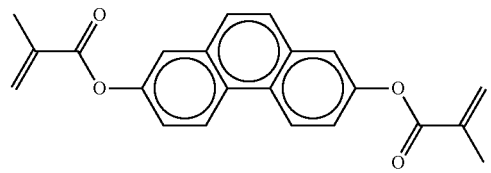

(M1-3)

Next, in order to form polymer layers from the compound represented by the formula (M1-3), the workpiece was irradiated with blacklight for three hours. This 3-hour blacklight irradiation caused polymerization and complete consumption of the compound represented by the formula (M1-3). Thereby, a polymer layer was formed on each of the first substrate and the second substrate. Finally, the temperature of the liquid crystal panel was increased up to Tni (110° C.) or higher and annealed for 30 minutes, so that re-alignment treatment was performed. Thereby, a UV2A-mode liquid crystal panel of Example 2 was obtained. A UV2A-mode liquid crystal panel of Comparative Example 2 was obtained in the same manner as in the case of the liquid crystal panel of Example 2, except that the liquid crystal alignment agent 1A was replaced by the liquid crystal alignment agent 1R. Owing to the baking of the applied liquid crystal alignment agents 1A and 1R at 230° C., the polymer (polyamic acid) represented by the formula (PA-11) and the polymer (polyamic acid) represented by the formula (PAR-11) were partially converted into a polyimide. In other words, the alignment films of the liquid crystal panel of Example 1 contain a polyimide formed by partial imidization of the polymer having a structure represented by the formula (PA-11) and the alignment films of the liquid crystal panel of Comparative Example 1 contain a polyimide formed by partial imidization of the polymer represented by the formula (PAR-11).

(Shock Test after High-Temperature Exposure)

The liquid crystal panel was stored in a 70° C. oven for 1000 hours, and a pinball (a steel ball having a diameter of 11 mm and a weight of 5.4 to 5.7 g) was fallen freely from a position 50 cm above the liquid crystal panel. Then, generation of bubbles was checked. The results are shown in Table 2.

TABLE 2

| | Alignment film | Shock test Results (presence or absence of bubble generation) |
|---|---|---|
| Example 2 | (PA-11) + (PS-11) | Absent |
| Comparative Example 2 | (PAR-11) + (PS-11) | Present |

When the shock test utilizing free fall of a pinball was performed after 70° C. storage, no bubbles were generated in the liquid crystal panel of Example 2 that contains a polyimide containing a bisaniline fluorene skeleton (polyimide formed by partial imidization of the polymer represented by the formula (PA-11)) in the alignment films. In contrast, bubbles were generated in the liquid crystal panel of Comparative Example 2 that contains neither a polyamic acid containing a bisaniline fluorene skeleton nor a polyimide containing a bisaniline fluorene skeleton in the alignment films. Although the three-hour blacklight irradiation caused generation of $N_2$ gas from the NQD, the presence of an polyimide containing a bisaniline fluorene skeleton in the alignment films seems to prevent permeation of the $N_2$ gas through the alignment films and dissolution of the $N_2$ gas in the liquid crystal layer even after the shock in the case of the liquid crystal panel of Example 2.

In contrast, the liquid crystal panel of Comparative Example 2 caused generation of bubbles. This is presumably because the $N_2$ gas generated from the NQD by the blacklight irradiation permeated the alignment films during storage of the liquid crystal panel at 70° C., and finally the shock caused the $N_2$ gas to dissolve in the liquid crystal layer, generating bubbles.

The above results show that the presence of a polyimide containing a bisaniline fluorene skeleton in an alignment film can reduce generation of bubbles in the liquid crystal layer even when an interlayer insulation film containing a photosensitizer (NQD) is present.

Examples 3 to 7 and Comparative Example 3

(Preparation of Liquid Crystal Alignment Agent)

A polymer (polyamic acid) represented by the following formula (PA-12) (m/(m+n)=0.2) which is a polymer that contains a bisaniline fluorene skeleton and that vertically aligns liquid crystal molecules was dissolved in a solvent mixture of NMP and γ-butyrolactone. Thereby, a liquid crystal alignment agent 3A having a solid concentration of 5 wt % was prepared. Also, liquid crystal alignment agents 4A, 5A, 6A, and 7A were prepared in the same manner as in the case of the liquid crystal alignment agent 3A, except that m/(m+n) in the following formula (PA-12) was changed to 0.4, 0.6, 0.8, and 1.0, respectively. Also, a liquid crystal alignment agent 3R was prepared in the same manner as in the case of the liquid crystal alignment agent 3A, except that m/(m+n) in the following formula (PA-12) was changed to 0.

The polymers represented by the following formula (PA-12) each had a weight average molecular weight of 10,000 or higher and 50,000 or lower.

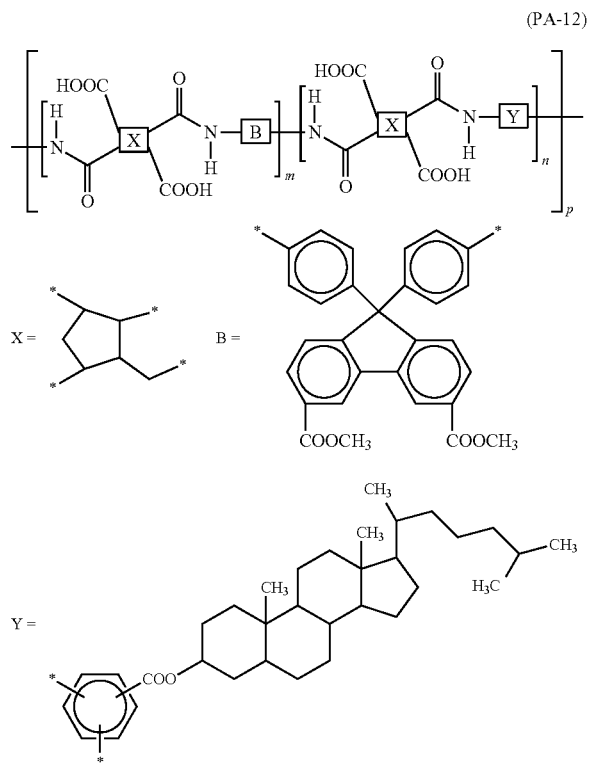

(Production of Liquid Crystal Panel)

A positive resist material containing an insulation polymer (epoxy polymer), a novolac resin, and an NQD which is a photosensitizer for positive resists was prepared. The positive resist material was applied in the form of a film on an insulating substrate by spin coating and the solvent was removed by heating. Then, the workpiece was irradiated with 5 J/cm² of non-polarized ultraviolet light, whereby an interlayer insulation film (positive resist) was formed. Further, ITO pixel electrodes were stacked on the interlayer insulation film, whereby a first substrate was produced. The interlayer insulation film contained the insulation polymer (epoxy polymer), the novolac resin, and the NQD. Subsequently, an ITO common electrode with fish-bone-structured slits and a color filter layer were formed in the given order on the insulating substrate. Thereby, a second substrate was produced.

The liquid crystal alignment agent 3A was applied to the first substrate and the second substrate. The workpieces were pre-baked at 80° C. for two minutes, then baked at 200° C. for 40 minutes. Next, a sealant was applied to the first substrate, and a liquid crystal material (Tni 80° C., Δε=−2.8, Δn=0.095) having negative anisotropy of dielectric constant and containing 0.3 wt % of a compound represented by the following formula (M1-1) was dropped on the first substrate. The second substrate was then attached thereto. The sealant used was a thermosetting one or an ultraviolet-curable one, or both of these sealants were used.

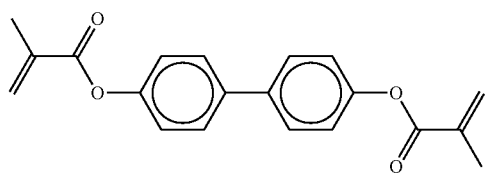

(M1-1)

Next, in order to polymerize the compound represented by the formula (M1-1) to form polymer layers, the workpiece was irradiated with light from a high-pressure mercury lamp for 15 minutes while a voltage of 10 V was applied, and then irradiated with blacklight for four hours in a no-voltage-application state in which no voltage was applied. This 4-hour blacklight irradiation caused polymerization and complete consumption of the compound represented by the formula (M1-1). Thereby, a polymer layer was formed on each of the first substrate and the second substrate. Finally, the temperature of the liquid crystal panel was increased up to Tni (110° C.) or higher and annealed for 30 minutes, so that re-alignment treatment was performed. Thereby, a liquid crystal panel of Example 3 was obtained.

Liquid crystal panels of Examples 4, 5, 6, and 7 and Comparative Example 3 were obtained in the same manner as in the case of the liquid crystal panel of Example 3, except that the liquid crystal alignment agent 3A was replaced respectively by the liquid crystal alignment agents 4A, 5A, 6A, 7A, and 3R. Owing to the baking of the applied liquid crystal alignment agents 3A to 7A and 3R at 230° C., the polymer (polyamic acid) represented by the formula (PA-12) was partially converted into a polyimide. In other words, the alignment films of the liquid crystal panels of Examples 3 to 7 contain a polyimide formed by partial imidization of the polymer represented by the formula (PA-12) and the alignment films of the liquid crystal panel of Comparative Example 3 contain a polyimide formed by partial imidization of the polymer represented by the formula (PA-12).

(Shock Test after Exposure to High-Temperature Backlight)

The liquid crystal panel was stored in a 70° C. oven for 1000 hours while irradiated with light from the backlight, and a pinball was fallen freely from a position 50 cm above the liquid crystal panel. Then, generation of bubbles was checked. The results are shown in Table 3.

TABLE 3

| | Alignment film | Shock test Results (presence or absence of bubble generation) |
|---|---|---|
| Comparative Example 3 | (PA-12) $m/(m + n) = 0$ | Present |
| Example 3 | (PA-12) $m/(m + n) = 0.2$ | Absent |
| Example 4 | (PA-12) $m/(m + n) = 0.4$ | Absent |
| Example 5 | (PA-12) $m/(m + n) = 0.6$ | Absent |
| Example 6 | (PA-12) $m/(m + n) = 0.8$ | Absent |
| Example 7 | (PA-12) $m/(m + n) = 1.0$ | Absent (without vertical alignment) |

When the shock test utilizing free fall of a pinball was performed after storage in a 70° C. oven with backlight irradiation, bubbles were generated in the liquid crystal panel of Comparative Example 3 that contains neither a polyamic acid containing a bisaniline fluorene skeleton nor a polyimide containing a bisaniline fluorene skeleton in the alignment films. In contrast, no bubbles were generated in the liquid crystal panels of Examples 3 to 7 each of which contains a polyimide containing a bisaniline fluorene skeleton in the alignment films. In the case of the liquid crystal panels of Examples 3 to 7, the presence of a polyimide containing a bisaniline fluorene skeleton in the alignment films seems to prevent permeation of the $N_2$ gas generated from the NQD by the high-pressure mercury lamp irradiation and the blacklight irradiation through the alignment films and dissolution of the $N_2$ gas in the liquid crystal layer even after the shock.

In contrast, the liquid crystal panel of Comparative Example 3, which contains neither a polyamic acid containing a bisaniline fluorene skeleton nor a polyimide containing a bisaniline fluorene skeleton in the alignment films, caused generation of bubbles. This is presumably because the $N_2$ gas generated from the NQD by the high-pressure mercury lamp irradiation and the blacklight irradiation permeated the alignment films and dissolved in the liquid crystal layer by the shock at the end, generating bubbles. Although the liquid crystal panel of Example 7 caused no generation of bubbles, liquid crystal molecules were not vertically aligned because the alignment films did not contain a polymer that vertically aligns liquid crystal molecules. As shown in Examples 3 to 6, the presence of a bisaniline fluorene skeleton and a polymer that vertically aligns liquid crystal molecules in the alignment films can reduce generation of bubbles in the liquid crystal panel and can vertically align liquid crystal molecules.

Examples 8 to 12 and Comparative Example 4

(Preparation of Liquid Crystal Alignment Agent)

A polymer (polyamic acid) represented by the following formula (PA-13) (m/(m+n)=0.2) which is a polymer that contains a bisaniline fluorene skeleton and a cinnamate group, a photo-alignment functional group, and that horizontally aligns liquid crystal molecules was dissolved in a solvent mixture of NMP and γ-butyrolactone. Thereby, a liquid crystal alignment agent 8A having a solid concentration of 5 wt % was prepared. Also, liquid crystal alignment agents 9A, 10A, 11A, and 12A were prepared in the same manner as in the case of the liquid crystal alignment agent 8A, except that m/(m+n) in the following formula (PA-13) was changed to 0.4, 0.6, 0.8, and 1.0, respectively. Also, a liquid crystal alignment agent 4R was prepared in the same manner as in the case of the liquid crystal alignment agent 8A, except that m/(m+n) in the following formula (PA-13) was changed to 0.

The polymers represented by the following formula (PA-13) each had a weight average molecular weight of 10,000 or higher and 50,000 or lower.

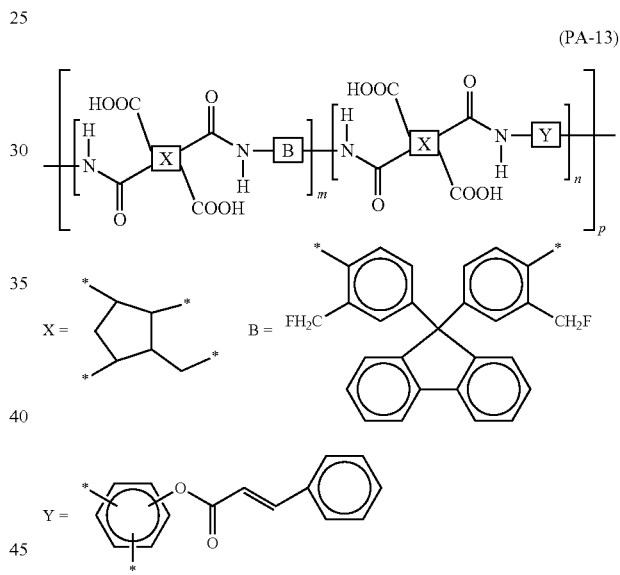

(PA-13)

(Production of Liquid Crystal Panel)

A positive resist material containing an insulation polymer (epoxy polymer), a novolac resin, and an NQD which is a photosensitizer for positive resists was prepared. The positive resist material was applied in the form of a film by spin coating and the solvent was removed by heating. Then, the workpiece was irradiated with 5 J/cm² of non-polarized ultraviolet light, whereby an interlayer insulation film (positive resist) was formed. Further, ITO pixel electrodes for the FFS mode, a SiN dielectric film (also referred to as a second insulating film), and an ITO common electrode were stacked in the give order on the interlayer insulation film, whereby a first substrate was produced. The interlayer insulation film contained the insulation polymer (epoxy polymer), the novolac resin, and the NQD. Subsequently, a color filter layer and an overcoat layer formed from an acrylic resin were formed in the given order on the insulating substrate. Thereby, a second substrate was produced.

The liquid crystal alignment agent 8A was applied to the first substrate and the second substrate. The workpieces were pre-baked at 80° C. for two minutes, then baked at 200° C. for 40 minutes, and subsequently irradiated with 100 mJ/cm$^2$ of polarized ultraviolet light in the direction normal to the substrates. Next, a sealant was applied to the first substrate, and a liquid crystal material (Tni 85° C., $\Delta\varepsilon=7.5$, $\Delta n=0.095$) having positive anisotropy of dielectric constant and containing 0.3 wt % of a compound containing a structure represented by the formula (M1-3) was dropped on the first substrate. The second substrate was then attached thereto. The sealant used was a thermosetting one or an ultraviolet-curable one, or both of these sealants were used.

Next, in order to form polymer layers from the compound represented by the formula (M1-3), the workpiece was irradiated with ultraviolet light B (ultraviolet light having a wavelength of about 320 to 380 nm; hereinafter, also referred to as UVB) in a no-voltage-application state for 20 minutes. Finally, the temperature of the liquid crystal panel was increased up to Tni (110° C.) or higher and annealed for 30 minutes, so that re-alignment treatment was performed. Thereby, a liquid crystal panel of Example 8 was obtained. Liquid crystal panels of Examples 9, 10, 11, and 12 and Comparative Example 4 were obtained in the same manner as in the case of the liquid crystal panel of Example 8, except that the liquid crystal alignment agent 8A was replaced respectively by the liquid crystal alignment agents 9A, 10A, 11A, 12A, and 4R. Owing to the baking of the applied liquid crystal alignment agents 8A to 12A and 4R at 230° C., the polymer (polyamic acid) represented by the formula (PA-13) was partially converted into a polyimide. In other words, the alignment films of the liquid crystal panels of Examples 8 to 12 contain a polyimide formed by partial imidization of the polymer represented by the formula (PA-13) and the alignment films of the liquid crystal panel of Comparative Example 4 contain a polyimide formed by partial imidization of the polymer represented by the formula (PA-13).

(Shock Test after Exposure to High-Temperature Backlight)

The resulting liquid crystal panels of Examples 8 to 12 and Comparative Example 4 were subjected to the shock test after exposure to high-temperature backlight. The results are shown in Table 4.

TABLE 4

| | Alignment film | Shock test Results (presence or absence of bubble generation) |
|---|---|---|
| Comparative Example 4 | (PA-13) m/(m + n) = 0 | Present |
| Example 8 | (PA-13) m/(m + n) = 0.2 | Absent |
| Example 9 | (PA-13) m/(m + n) = 0.4 | Absent |
| Example 10 | (PA-13) m/(m + n) = 0.6 | Absent |
| Example 11 | (PA-13) m/(m + n) = 0.8 | Absent |
| Example 12 | (PA-13) m/(m + n) = 1.0 | Absent (without horizontal alignment) |

When the shock test utilizing free fall of a pinball was performed after storage in a 70° C. oven with backlight irradiation, bubbles were generated in the liquid crystal panel of Comparative Example 4 that contains neither a polyamic acid containing a bisaniline fluorene skeleton nor a polyimide containing a bisaniline fluorene skeleton in the alignment films. In contrast, no bubbles were generated in the liquid crystal panels of Examples 8 to 12 each of which contains a polyimide containing a bisaniline fluorene skeleton in the alignment films. In the case of the liquid crystal panels of Examples 8 to 12, the presence of a polyimide containing a bisaniline fluorene skeleton in the alignment films seems to prevent permeation of the $N_2$ gas generated from the NQD by the UVB irradiation through the alignment films and dissolution of the $N_2$ gas in the liquid crystal layer even after the shock.

In contrast, the liquid crystal panel of Comparative Example 4, which contains neither a polyamic acid containing a bisaniline fluorene skeleton nor a polyimide containing a bisaniline fluorene skeleton in the alignment films, caused generation of bubbles. This is presumably because the $N_2$ gas generated from the NQD by the UVB irradiation permeated the alignment films and dissolved in the liquid crystal layer by the shock at the end, generating bubbles. Although the liquid crystal panel of Example 12 caused no generation of bubbles, liquid crystal molecules were not horizontally aligned because the alignment films did not contain a polymer that horizontally aligns liquid crystal molecules. As shown in Examples 8 to 11, the presence of a bisaniline fluorene skeleton and a polymer that horizontally aligns liquid crystal molecules in the alignment films can reduce generation of bubbles in the liquid crystal panel and can horizontally align liquid crystal molecules.

<Additional Remarks>

One aspect of the present invention may be the alignment films 40 and 50 each containing at least one selected from the group consisting of a polyamic acid containing a bisaniline fluorene skeleton and a polyimide containing a bisaniline fluorene skeleton. A film formed from the polymer containing the bisaniline fluorene skeleton is permeable to $CO_2$ and impermeable to $N_2$. Thus, such an aspect can reduce permeation of nitrogen gas generated in the interlayer insulation film(s) 13 through the alignment films 40 and 50 and dissolution of the nitrogen gas in the liquid crystal layer 30, and can reduce generation of bubbles in the liquid crystal layer 30.

The bisaniline fluorene skeleton of the polyamic acid may be contained in a diamine unit of the polyamic acid, and the bisaniline fluorene skeleton of the polyimide may be contained in a diamine unit of the polyimide. Such an embodiment allows the bisaniline fluorene skeleton to be introduced into the polyamic acid or the polyimide easily.

At least one selected from the group consisting of the bisaniline fluorene skeleton of the polyamic acid and the bisaniline fluorene skeleton of the polyimide may contain at least one of the structures represented by the following respective formulae (B1-1) to (B1-11). Such an embodiment can further reduce permeation of nitrogen gas generated in the liquid crystal panel through the alignment films 40 and 50 and dissolution of the nitrogen gas in the liquid crystal layer 30.

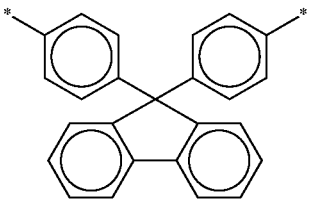

(B1-1)

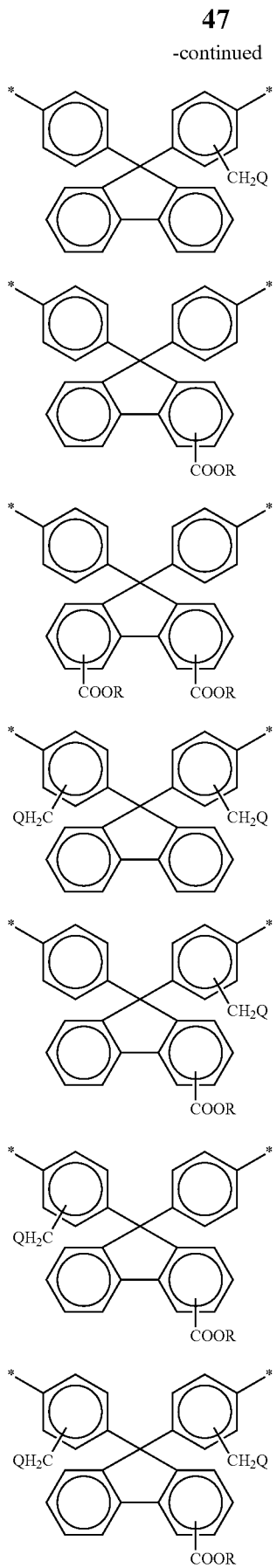
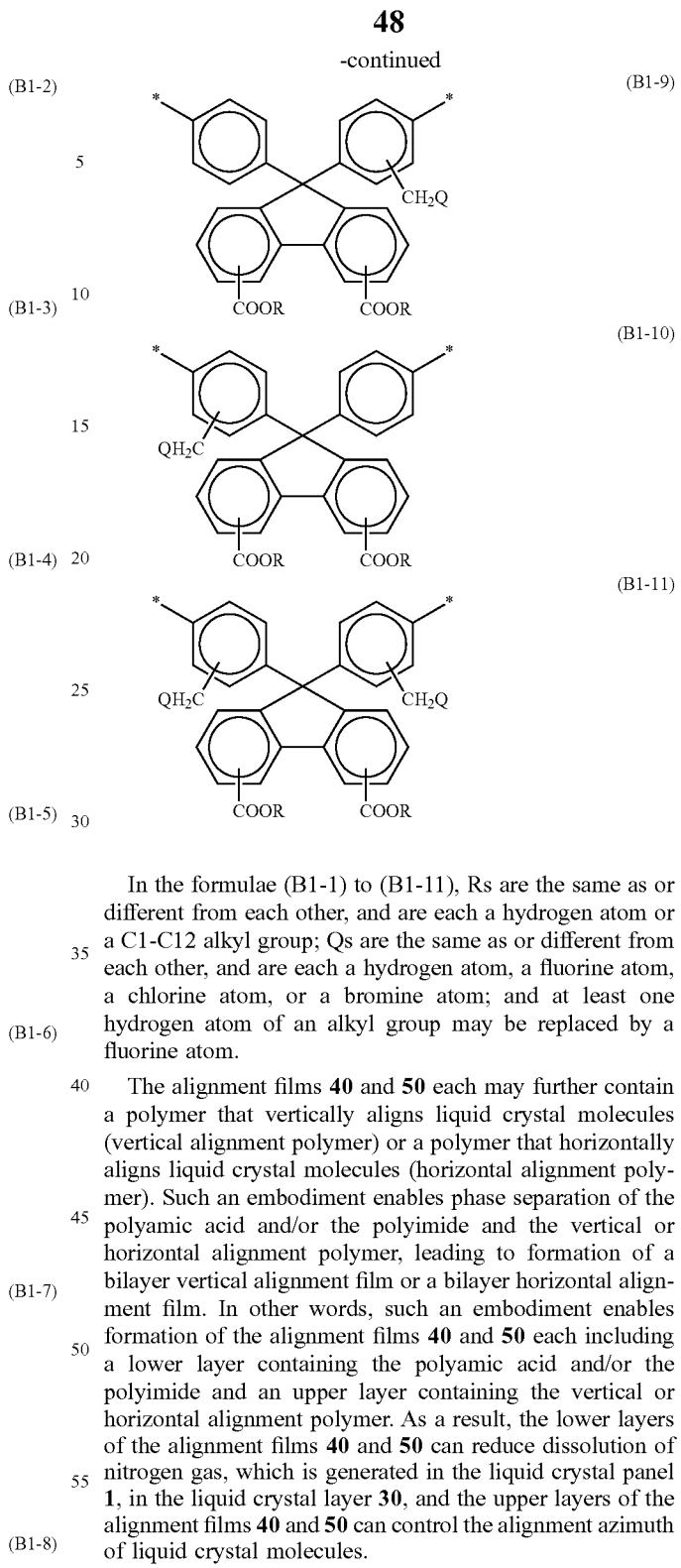

In the formulae (B1-1) to (B1-11), Rs are the same as or different from each other, and are each a hydrogen atom or a C1-C12 alkyl group; Qs are the same as or different from each other, and are each a hydrogen atom, a fluorine atom, a chlorine atom, or a bromine atom; and at least one hydrogen atom of an alkyl group may be replaced by a fluorine atom.

The alignment films 40 and 50 each may further contain a polymer that vertically aligns liquid crystal molecules (vertical alignment polymer) or a polymer that horizontally aligns liquid crystal molecules (horizontal alignment polymer). Such an embodiment enables phase separation of the polyamic acid and/or the polyimide and the vertical or horizontal alignment polymer, leading to formation of a bilayer vertical alignment film or a bilayer horizontal alignment film. In other words, such an embodiment enables formation of the alignment films 40 and 50 each including a lower layer containing the polyamic acid and/or the polyimide and an upper layer containing the vertical or horizontal alignment polymer. As a result, the lower layers of the alignment films 40 and 50 can reduce dissolution of nitrogen gas, which is generated in the liquid crystal panel 1, in the liquid crystal layer 30, and the upper layers of the alignment films 40 and 50 can control the alignment azimuth of liquid crystal molecules.

The alignment films 40 and 50 each may further contain a polymer containing a photo-alignment functional group. Such an embodiment can eliminate generation of striped display unevenness and of static electricity which may occur when the alignment films 40 and 50 used are those for rubbing treatment. Further, such an embodiment enables contactless alignment treatment, improving the alignment and alignment stability of the liquid crystal without impairment of components such as TFTs.

The photo-alignment functional group may include at least one group selected from the group consisting of cinnamate, azobenzene, coumarin, chalcone, and cyclobutane groups.

At least one selected from the group consisting of the polyamic acid and the polyimide may be a polymer that vertically aligns liquid crystal molecules or a polymer that horizontally aligns liquid crystal molecules. Such an embodiment can give both a function of reducing dissolution of nitrogen gas in the liquid crystal layer 30 and a function of controlling the alignment of liquid crystal molecules to at least one selected from the group consisting of the polyamic acid and the polyimide, forming the alignment films 40 and 50 in the form of monolayer.

At least one selected from the group consisting of the polyamic acid and the polyimide may further contain a photo-alignment functional group. Such an embodiment can eliminate generation of striped display unevenness and of static electricity which may occur when the alignment films 40 and 50 are those for rubbing treatment. Further, such an embodiment enables contactless alignment treatment, improving the alignment and alignment stability of the liquid crystal without impairment of components such as TFTs.

The photo-alignment functional group may include at least one group selected from the group consisting of cinnamate, azobenzene, coumarin, chalcone, and cyclobutane groups.

Another aspect of the present invention may be the liquid crystal panel 1 including: the alignment film(s) 40 and/or 50; the first substrate 10; the second substrate 20 facing the first substrate 10; and the liquid crystal layer 30 between the first substrate 10 and the second substrate 20, the alignment film(s) 40 and/or 50 being disposed on a surface of at least one selected from the group consisting of the first substrate 10 and the second substrate 20, the surface being adjacent to the liquid crystal layer 30. Such an aspect can reduce permeation of nitrogen gas generated in the interlayer insulation film(s) 13 through the alignment films 40 and 50 and dissolution of the nitrogen gas in the liquid crystal layer 30, and can reduce generation of bubbles in the liquid crystal layer 30.

At least one substrate provided with the alignment film 40 or 50 selected from the first substrate 10 and the second substrate 20 may include the insulation film 13 containing at least one selected from the group consisting of a positive resist and a photo-reaction product thereof. The insulation film 13 may be formed from a positive resist.

The positive resist may contain a naphthoquinone diazide compound. Such an embodiment can particularly effectively reduce generation of bubbles in the liquid crystal layer 30.

The liquid crystal panel 1 may further include the polymer layers 60 and 70. Such an embodiment can particularly effectively reduce generation of bubbles in the liquid crystal layer 30.

Still another aspect of the present invention may be a method for producing a liquid crystal panel, including: forming the alignment film 40 or 50 on a surface of at least one selected from the group consisting of the first substrate 10 and the second substrate 20; and sealing a liquid crystal material between the first substrate 10 and the second substrate 20 to form the liquid crystal layer 30. Such an aspect can reduce permeation of nitrogen gas generated in the interlayer insulation film(s) 13 through the alignment films 40 and 50 and dissolution of the nitrogen gas in the liquid crystal layer 30, and can reduce generation of bubbles in the liquid crystal layer 30.

At least one substrate provided with the alignment film 40 or 50 selected from the first substrate 10 and the second substrate 20 may include the insulation film 13 containing at least one selected from the group consisting of a positive resist and a photo-reaction product thereof. The insulation film 13 may be formed from a positive resist.

The positive resist may contain a naphthoquinone diazide compound. Such an embodiment can particularly effectively reduce generation of bubbles in the liquid crystal layer 30.

The method for producing a liquid crystal panel may further include forming the polymer layers 60 and 70. Such an embodiment can particularly effectively reduce generation of bubbles in the liquid crystal layer 30.

The liquid crystal material may contain a polymerizable monomer, and in the formation of the polymer layers 60 and 70, the liquid crystal layer 30 may be irradiated with ultraviolet light and thereby the polymerizable monomer may be polymerized to form a polymer, and then the polymer may be phase-separated, whereby the polymer layers 40 and 50 may be formed. Such an embodiment can particularly effectively reduce permeation of nitrogen gas generated in the interlayer insulation film(s) 13 through the alignment films 40 and 50 and dissolution of the nitrogen gas in the liquid crystal layer 30, and can reduce generation of bubbles in the liquid crystal layer 30.

What is claimed is:

1. An alignment film comprising:
at least one selected from the group consisting of a polyamic acid containing at least one structure represented by the following formula (PA-1) and a polyimide containing at least one structure represented by the following formula (PI-1),

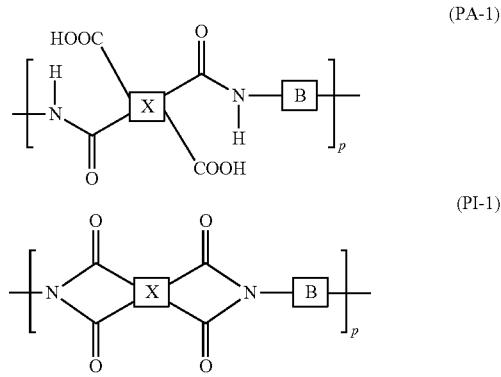

wherein Bs are the same as or different from each other and are each a divalent group containing at least one of the structures represented by the following formulae (B1-1) to (B1-11);
Xs are the same as or different from each other and are each a tetravalent group represented by the following formula (X-4) or (X-9); and p is an integer of 1 or greater,

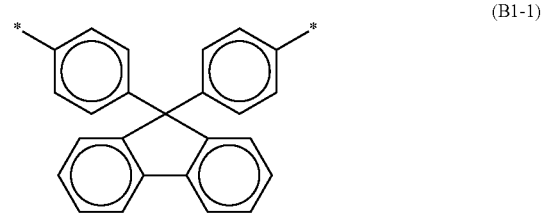

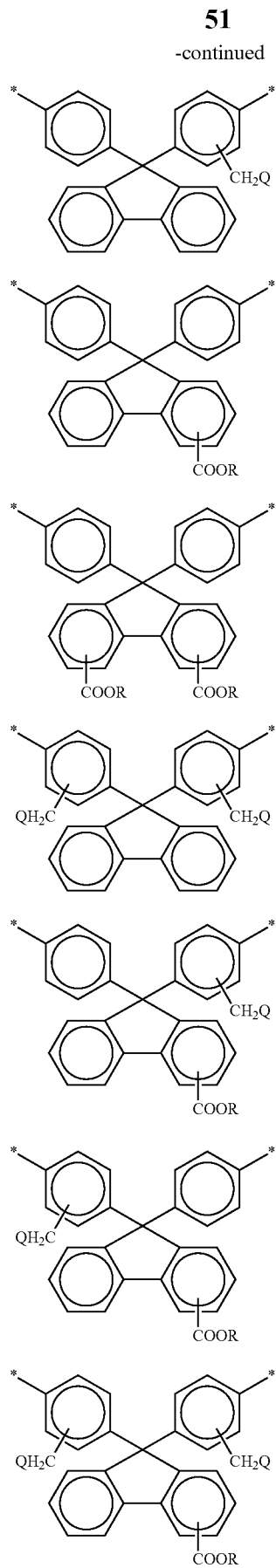

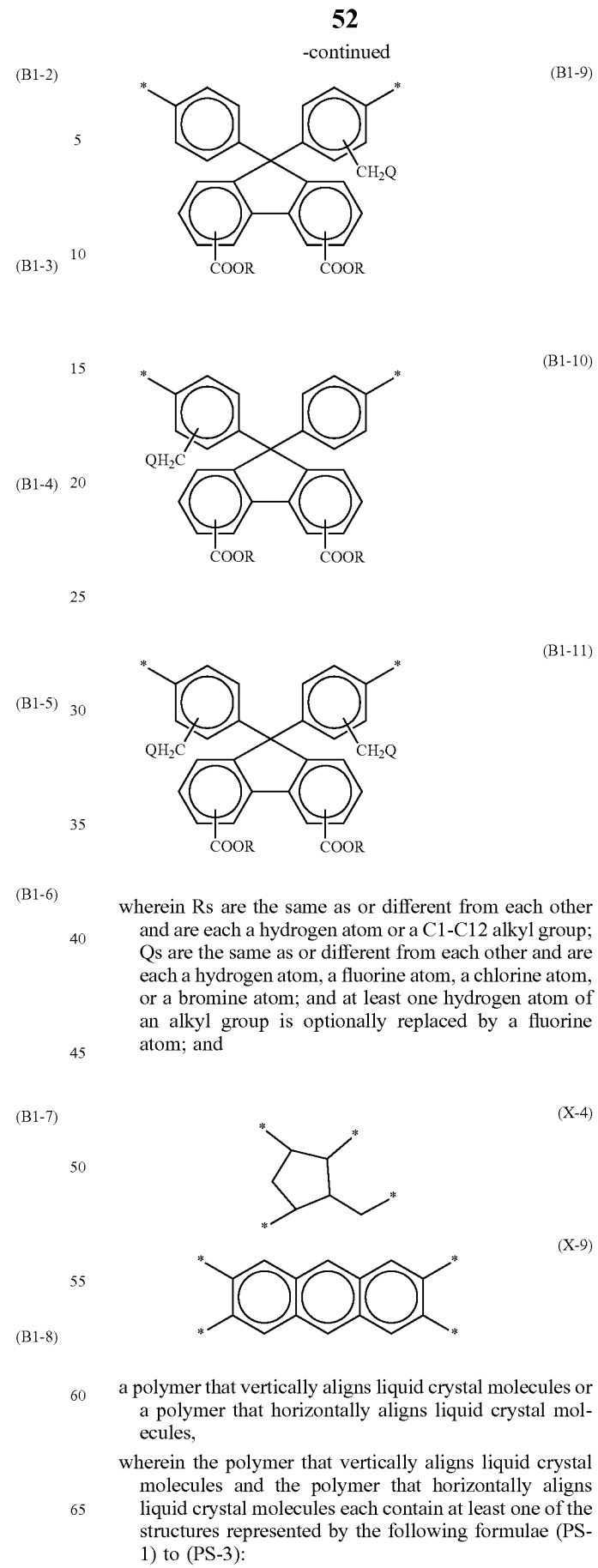

wherein Rs are the same as or different from each other and are each a hydrogen atom or a C1-C12 alkyl group; Qs are the same as or different from each other and are each a hydrogen atom, a fluorine atom, a chlorine atom, or a bromine atom; and at least one hydrogen atom of an alkyl group is optionally replaced by a fluorine atom; and a polymer that vertically aligns liquid crystal molecules or a polymer that horizontally aligns liquid crystal molecules, wherein the polymer that vertically aligns liquid crystal molecules and the polymer that horizontally aligns liquid crystal molecules each contain at least one of the structures represented by the following formulae (PS-1) to (PS-3):

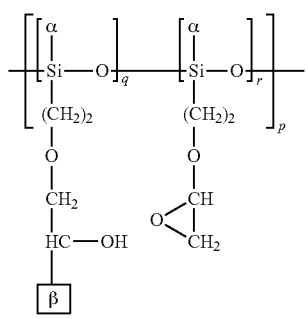

(PS-1)

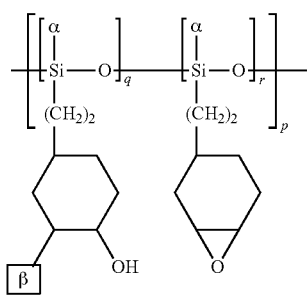

(PS-2)

wherein αs are the same as or different from each other and are each a hydrogen atom, a hydroxy group, or a C1-C5 alkoxy group; βs are the same as or different from each other and are each a monovalent group containing a cinnamate group; and p, q, and r are each individually an integer of 1 or greater, with q and r satisfying 0<r/(q+r)<1

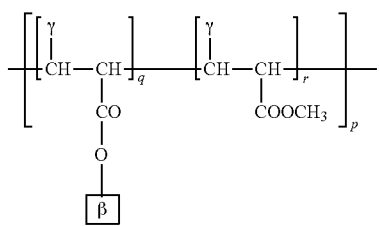

(PS-3)

wherein βs are the same as or different from each other and are each a monovalent group containing a cinnamate group; γs are the same as or different from each other and are each a hydrogen atom or a C1-C5 alkyl group; and p, q, and r are each individually an integer of 1 or greater, with q and r satisfying 0<r/(q+r)<1.

2. The alignment film according to claim 1, further comprising a different polymer containing a photo-alignment functional group,
wherein the photo-alignment functional group includes at least one group selected from the group consisting of cinnamate, azobenzene, coumarin, chalcone, and cyclobutene groups.

3. A liquid crystal panel comprising:
the alignment film according to claim 1;
a first substrate;
a second substrate facing the first substrate; and
a liquid crystal layer between the first substrate and the second substrate,
the alignment film being disposed on a surface of at least one substrate selected from the group consisting of the first substrate and the second substrate, the surface being adjacent to the liquid crystal layer.

4. The liquid crystal panel according to claim 3,
wherein the at least one substrate provided with the alignment film selected from the first substrate and the second substrate includes an insulation film containing at least one selected from the group consisting of a positive resist and a photo-reaction product thereof.

5. The liquid crystal panel according to claim 4,
wherein the positive resist contains a naphthoquinone diazide compound.

6. The liquid crystal panel according to claim 3, further comprising a polymer layer.

7. The alignment film according to claim 6,
wherein the polymer layer is a layer formed by polymerizing a polymerizable monomer containing at least one of the structures represented by the following formulae (M1-1) to (M1-3):

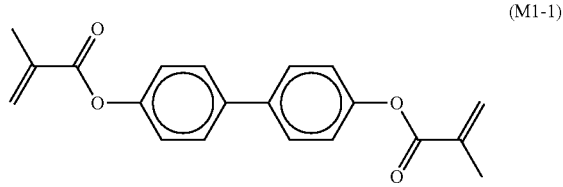

(M1-1)

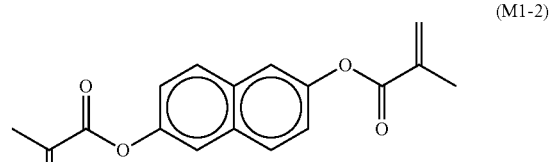

(M1-2)

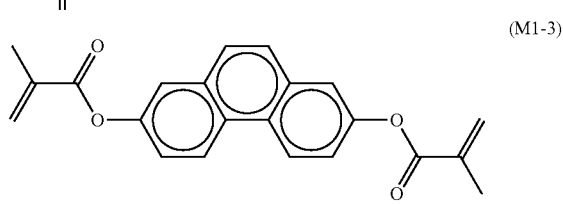

(M1-3)

8. The alignment film according to claim 1,
wherein the polyamic acid is a polymer represented by the following formula (PA-11), and
the polymer that vertically aligns liquid crystal molecules is a polymer represented by the following formula (PS-11),

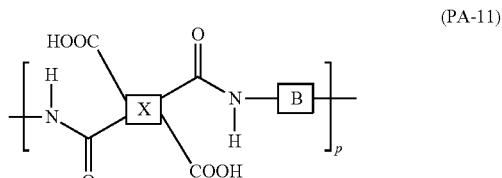

(PA-11)

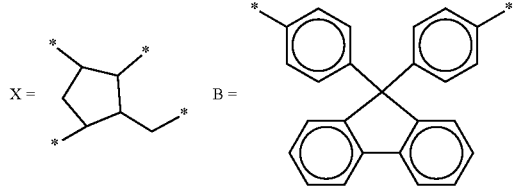

wherein p is an integer of 1 or greater,

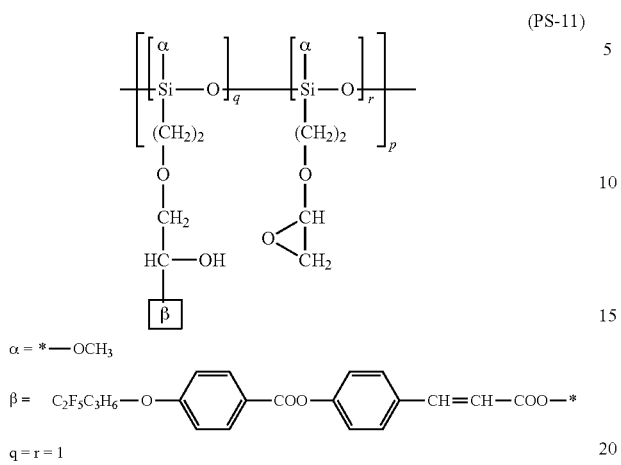

(PS-11)

$\alpha = * \!-\! OCH_3$ $\beta = C_2F_5C_3H_6\!-\!O\!-\!\bigcirc\!-\!COO\!-\!\bigcirc\!-\!CH\!=\!CH\!-\!COO\!-\!*$ q = r = 1 wherein p is an integer of 1 or greater.

9. An alignment film comprising:
at least one selected from the group consisting of a polyamic acid containing at least one structure represented by the following formula (PA-2) and a polyimide containing at least one structure represented by the following formula (PI-2),

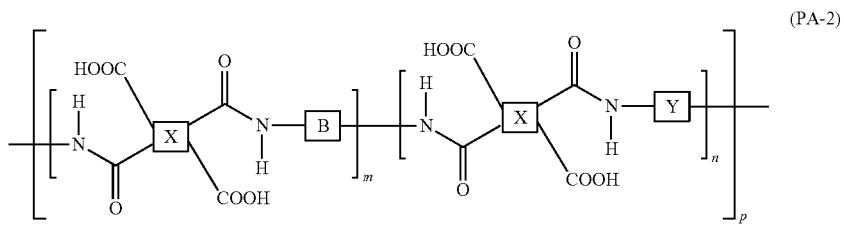

(PA-2)

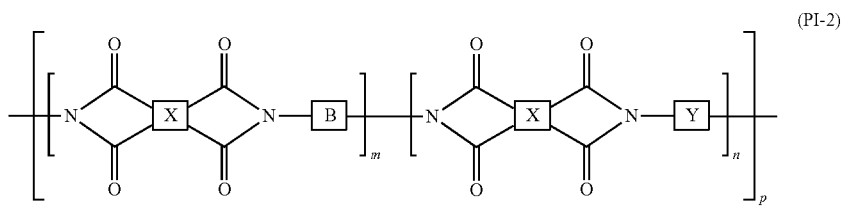

(PI-2)

wherein Bs are the same as or different from each other and are each a divalent group containing at least one of the structures represented by the following formulae (B1-1) to (B1-11);

Xs are the same as or different from each other and are each a tetravalent group represented by the following formula (X-4) or (X-9); Ys are the same as or different from each other and are each a divalent group represented by the following formulae (Y-1) to (Y-42); and m, n, and p are each individually an integer of 1 or greater, with m and n satisfying 0<m/(m+n)<1,

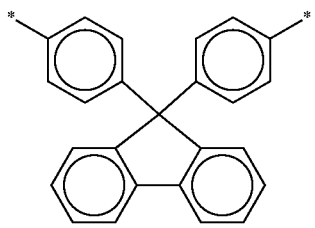

(B1-1)

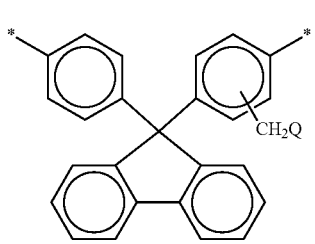

(B1-2)

-continued

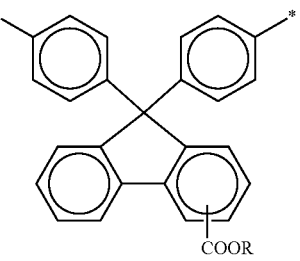

(B1-3)

(B1-4) 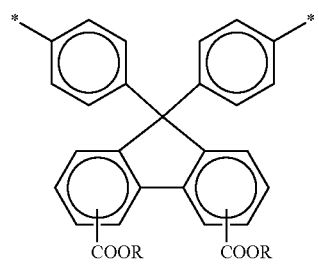
(B1-5) 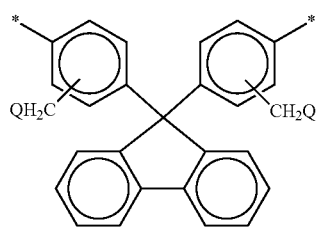
(B1-6) 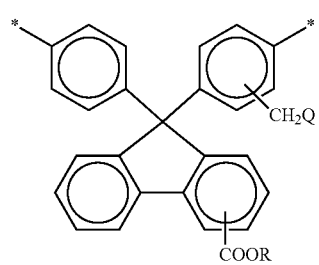
(B1-7) 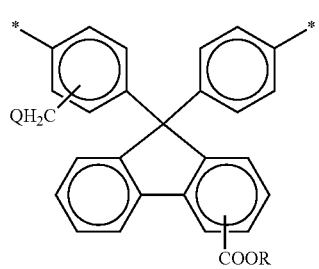
(B1-8) 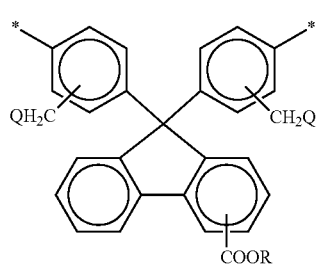
(B1-9) 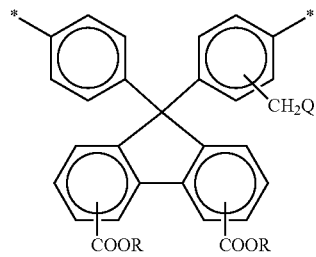
(B1-10) 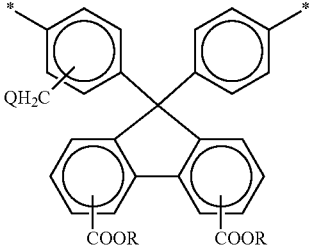
(B1-11) 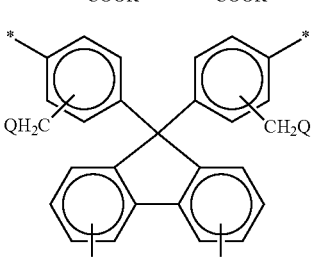
wherein Rs are the same as or different from each other and are each a hydrogen atom or a C1-C12 alkyl group; Qs are the same as or different from each other and are each a hydrogen atom, a fluorine atom, a chlorine atom, or a bromine atom; and at least one hydrogen atom of an alkyl group is optionally replaced by a fluorine atom,
(X-4) 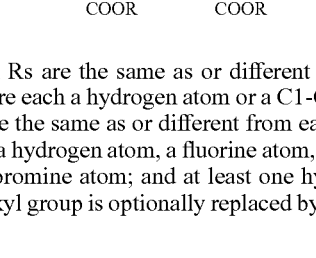
(X-9) 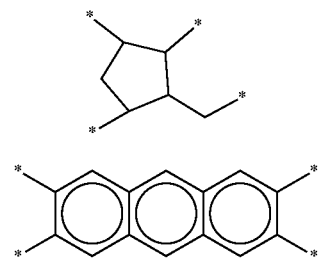
(Y-1) 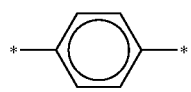
(Y-2) 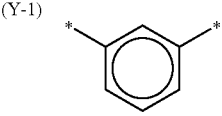
(Y-3) 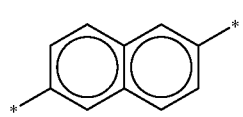
(Y-4) 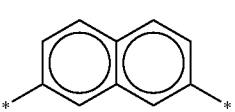

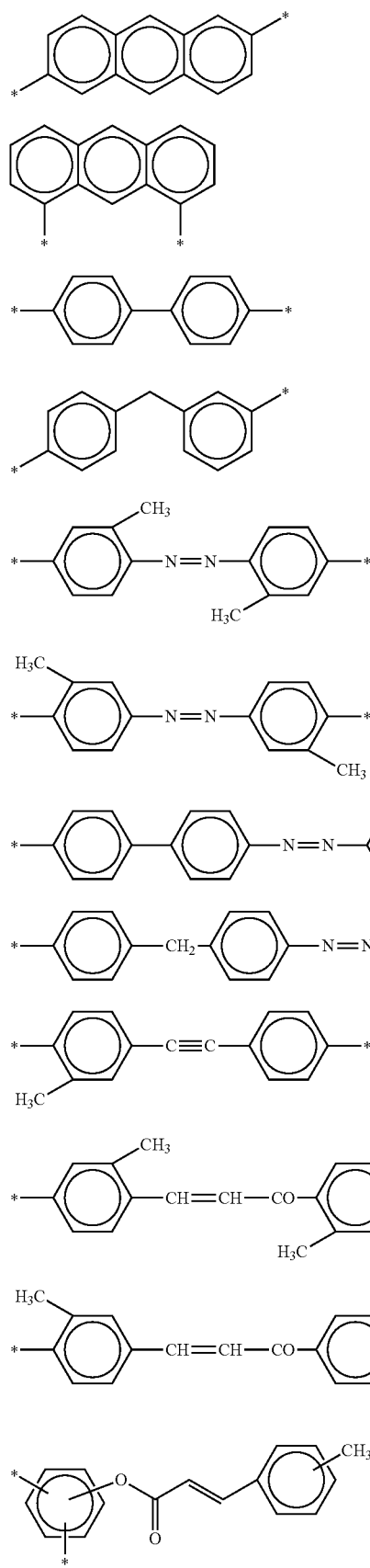

-continued
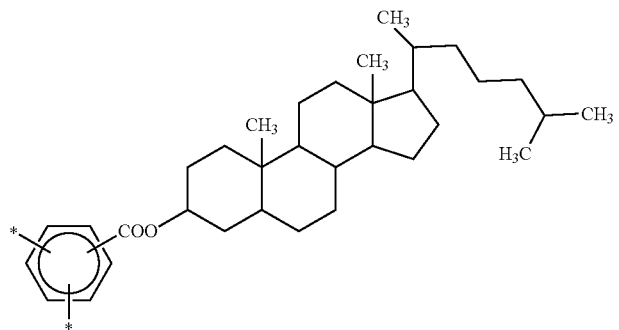
(Y-25)
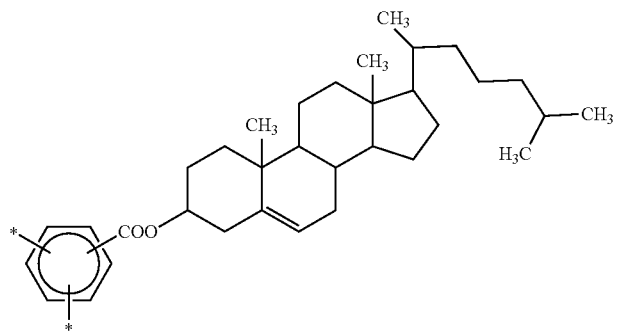
(Y-26)
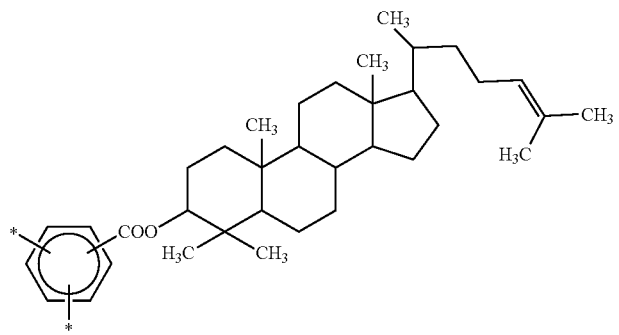
(Y-27)
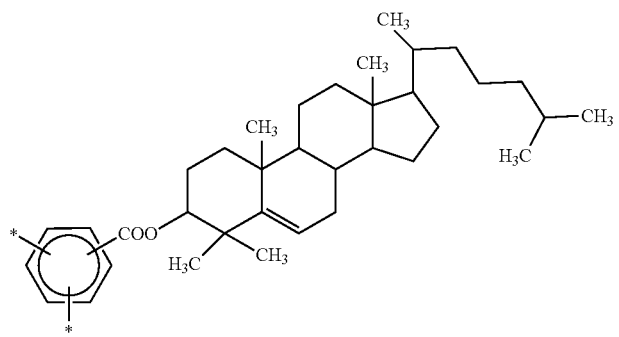
(Y-28)
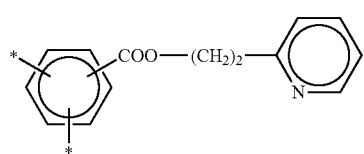
(Y-29)
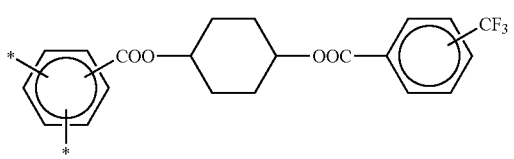
(Y-30)

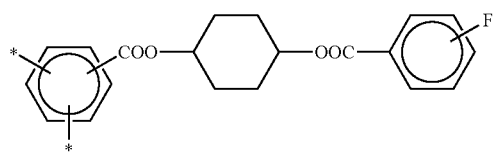
(Y-31)
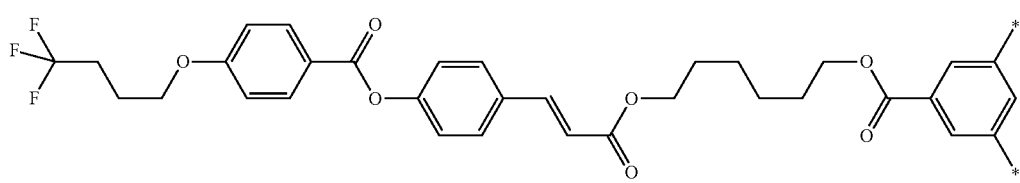
(Y-32)
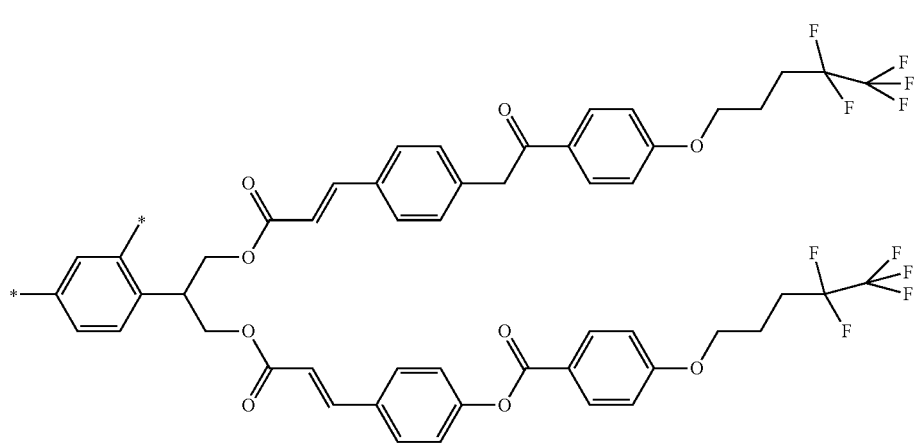
(Y-33)
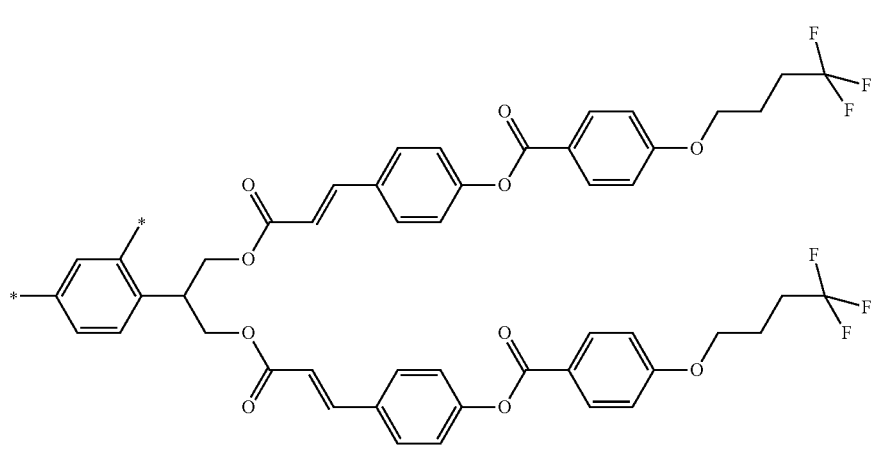
(Y-34)
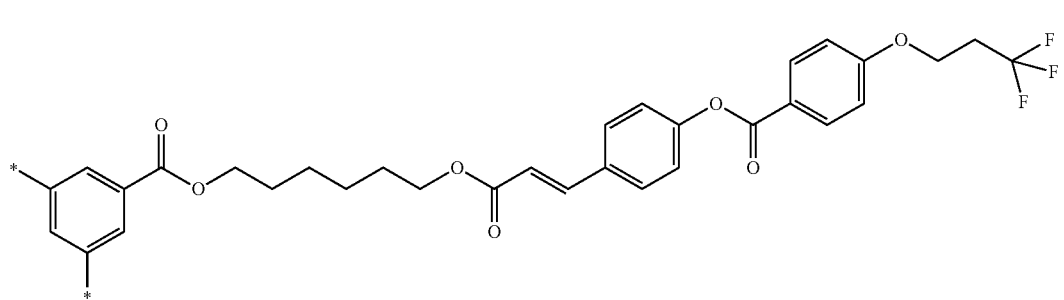
(Y-35)

(Y-36)
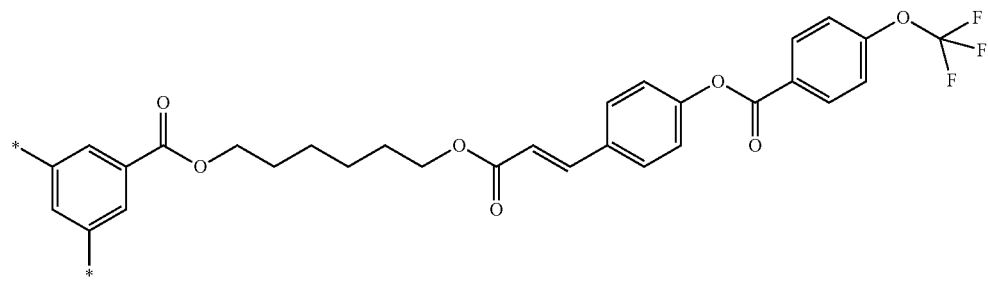
(Y-37)
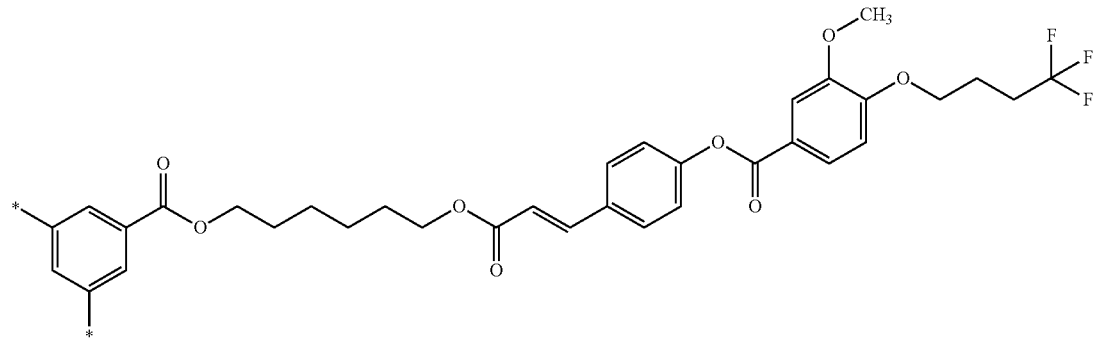
(Y-38)
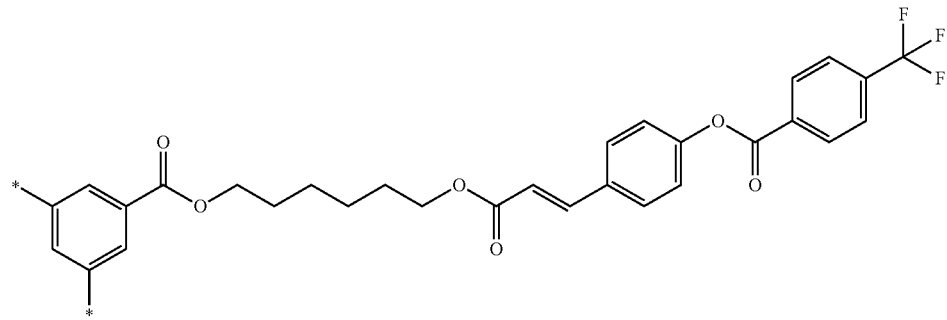
(Y-39)
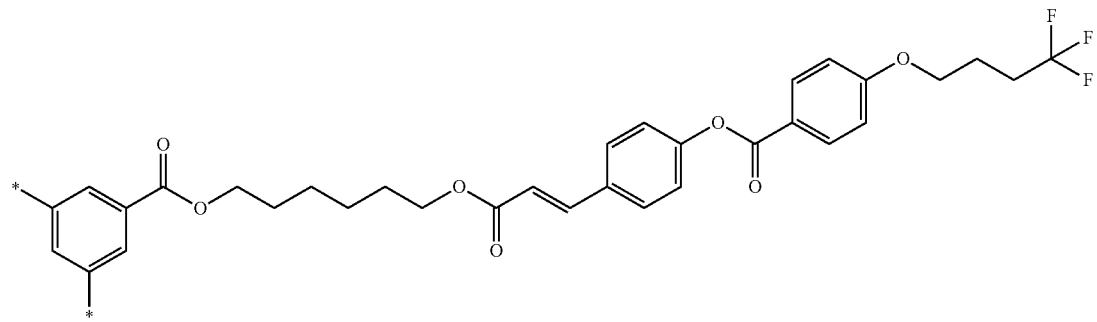
(Y-40)
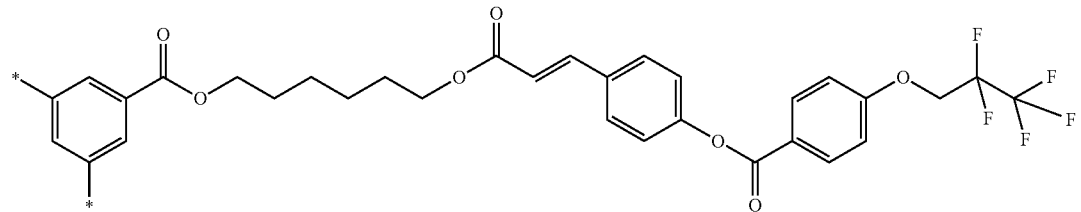

-continued (Y-41)
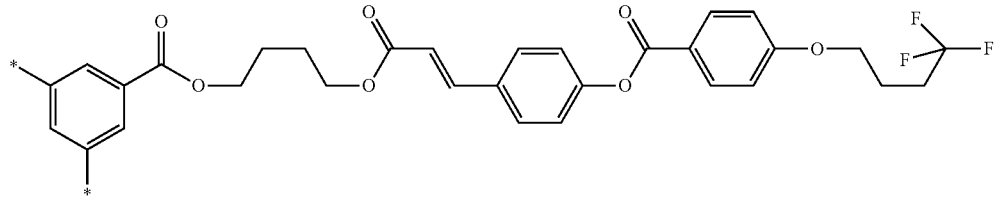

(Y-42)
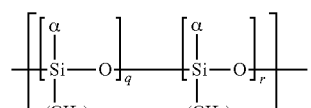

a polymer that vertically aligns liquid crystal molecules or a polymer that horizontally aligns liquid crystal molecules, wherein the polymer that vertically aligns liquid crystal molecules and the polymer that horizontally aligns liquid crystal molecules each contain at least one of the structures represented by the following respective formulae (PS-1) to (PS-3):

(PS-1)
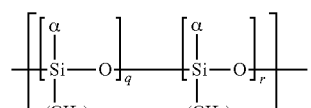

(PS-2)
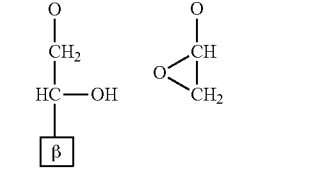

wherein αs are the same as or different from each other and are each a hydrogen atom, a hydroxy group, or a C1-C5 alkoxy group; βs are the same as or different from each other and are each a monovalent group containing a cinnamate group; and p, q, and r are each individually an integer of 1 or greater, with q and r satisfying 0<r/(q+r)<1, (PS-3)
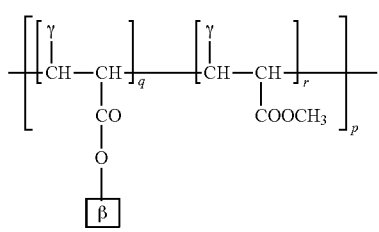

wherein βs are the same as or different from each other and are each a monovalent group containing a cinnamate group; γs are the same as or different from each other and are each a hydrogen atom or a C1-C5 alkyl group; and p, q, and r are each individually an integer of 1 or greater, with q and r satisfying 0<r/(q+r)<1.

10. The alignment film according to claim 9, wherein the polyamic acid is a polymer represented by the following formula (PA-12):

(PA-12)
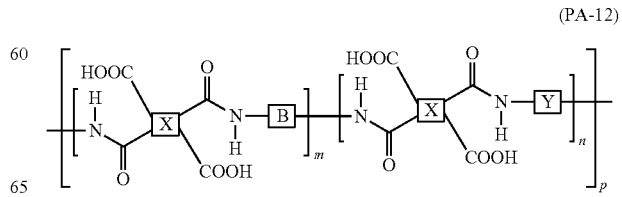

-continued

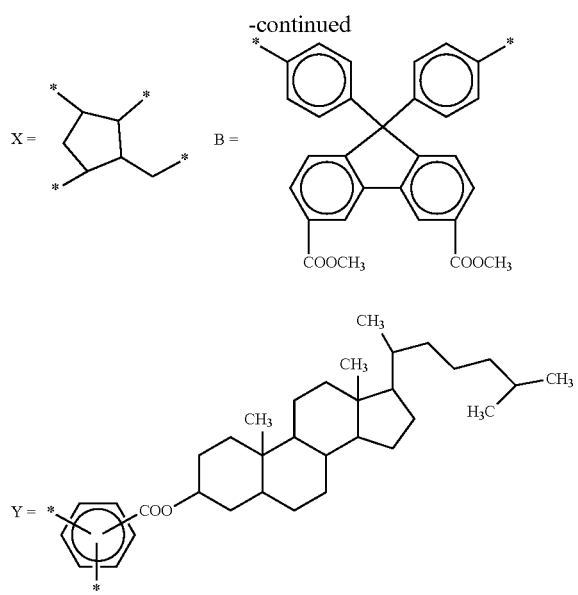

wherein m, n, and p are each individually an integer of 1 or greater, with m and n satisfying 0.2≤m/(m+n) <1.

11. The alignment film according to claim 9,
wherein the polyamic acid is a polymer represented by the following formula (PA-13):

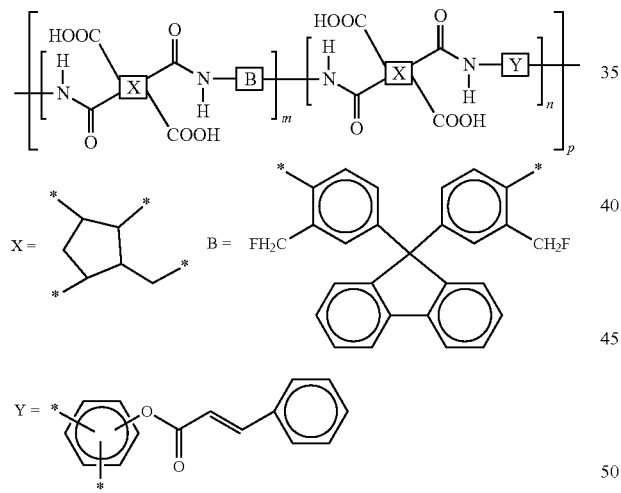

wherein m, n, and p are each individually an integer of 1 or greater, with m and n satisfying 0.2≤m/(m+n)<1.

12. The alignment film according to claim 9, further comprising a different polymer containing a photo-alignment functional group, wherein the photo-alignment functional group includes at least one group selected from the group consisting of cinnamate, azobenzene, coumarin, chalcone, and cyclobutene groups.

13. A liquid crystal panel comprising:
the alignment film according to claim 9;
a first substrate;
a second substrate facing the first substrate; and
a liquid crystal layer between the first substrate and the second substrate,
the alignment film being disposed on a surface of at least one substrate selected from the group consisting of the first substrate and the second substrate, the surface being adjacent to the liquid crystal layer.

14. The liquid crystal panel according to claim 13,
wherein the at least one substrate provided with the alignment film selected from the first substrate and the second substrate includes an insulation film containing at least one selected from the group consisting of a positive resist and a photo-reaction product thereof.

15. The liquid crystal panel according to claim 14, wherein the positive resist contains a naphthoquinone diazide compound.

16. The liquid crystal panel according to claim 13, further comprising a polymer layer.

17. The alignment film according to claim 16,
wherein the polymer layer is a layer formed by polymerizing a polymerizable monomer containing at least one of the structures represented by the following formulae (M1-1) to (M1-3):

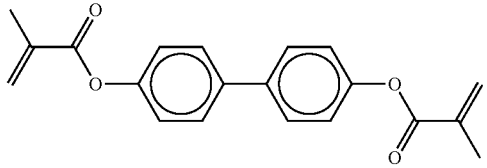

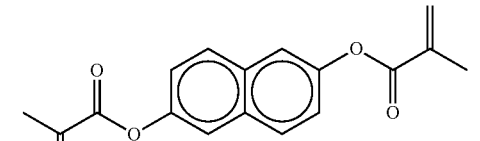

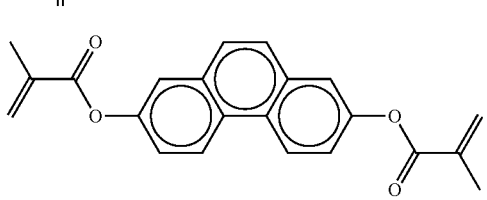

* * * * *